(12) United States Patent
Nguyen et al.

(10) Patent No.: US 7,723,010 B2
(45) Date of Patent: *May 25, 2010

(54) REACTIVE NEAR INFRARED ABSORBING POLYMERIC PARTICLES, METHODS OF PREPARATION AND USES THEREOF

(75) Inventors: My T. Nguyen, Kirkland (CA); Marc Andre Locas, Pierrefonds (CA)

(73) Assignee: American Dye Source, Inc., Baie D'urfé (CA)

( * ) Notice: Subject to any disclaimer, the term of this patent is extended or adjusted under 35 U.S.C. 154(b) by 71 days.

This patent is subject to a terminal disclaimer.

(21) Appl. No.: 11/836,914

(22) Filed: Aug. 10, 2007

(65) Prior Publication Data

US 2008/0171286 A1 Jul. 17, 2008

Related U.S. Application Data

(60) Provisional application No. 60/823,415, filed on Aug. 24, 2006.

(51) Int. Cl.
G03F 7/26 (2006.01)
B32B 5/16 (2006.01)

(52) U.S. Cl. .............. 430/270.1; 428/402; 430/302; 430/281.1

(58) Field of Classification Search .............. 430/302; 428/402

See application file for complete search history.

(56) References Cited

U.S. PATENT DOCUMENTS

| | | | |
|---|---|---|---|
| 5,569,573 A | 10/1996 | Takahashi et al. | |
| 6,037,102 A | 3/2000 | Loerzer et al. | |
| 6,124,425 A | 9/2000 | Nguyen | |
| 6,132,933 A * | 10/2000 | Nguyen | 430/272.1 |
| 6,177,182 B1 | 1/2001 | Nguyen | |
| 6,261,740 B1 | 7/2001 | Nguyen et al. | |
| 6,582,882 B2 | 6/2003 | Pappas et al. | |
| 6,777,155 B2 * | 8/2004 | Oshima | 430/157 |
| 6,849,678 B1 | 2/2005 | Lee et al. | |
| 6,889,994 B1 | 5/2005 | Birkenbaugh | |
| 6,953,652 B2 | 10/2005 | Van Damme et al. | |
| 6,960,422 B2 | 11/2005 | Goto | |
| 6,969,575 B2 | 11/2005 | Inno | |
| 6,983,694 B2 | 1/2006 | Vermeersch et al. | |
| 7,001,673 B2 | 2/2006 | Yamasaki et al. | |

(Continued)

FOREIGN PATENT DOCUMENTS

EP    1 117 005 A1    7/2001

(Continued)

Primary Examiner—Cynthia H Kelly
Assistant Examiner—Chanceity N Robinson
(74) Attorney, Agent, or Firm—Goudreau Gage Dubuc; Alain M. Leclerc

(57) ABSTRACT

There is provided polymeric particles having a particle size between about 60 nm and about 1000 nm and comprising a polymer, the polymer comprising a hydrophobic backbone, a near infrared absorbing segment having attached thereto a near infrared absorbing chromophore having an absorption peak between about 700 nm and about 1100 nm; and a near infrared transparent segment. Method of manufacture these particles are also provided. A coating composition comprising the above-polymeric particles and a reactive iodonium oligomer is also provided. Finally, a negative-working lithographic offset printing plate comprising a substrate; a hydrophilic under layer; and a laser imageable upper layer, wherein the laser imageable upper layer comprises the above polymeric particle is also provided.

22 Claims, 16 Drawing Sheets

U.S. PATENT DOCUMENTS

| | | |
|---|---|---|
| 7,001,704 B2 | 2/2006 | Oshima et al. |
| 7,070,902 B2 * | 7/2006 | Mulligan et al. ............ 430/200 |
| 7,078,145 B2 | 7/2006 | Yanaka |
| 2003/0064318 A1 | 4/2003 | Huang et al. |
| 2003/0157433 A1 | 8/2003 | Timpe et al. |
| 2005/0123853 A1 | 6/2005 | Munnelly et al. |
| 2007/0269739 A1 * | 11/2007 | Nguyen et al. ........... 430/270.1 |

FOREIGN PATENT DOCUMENTS

| | | |
|---|---|---|
| EP | 0 770 495 B1 | 6/2002 |
| EP | 1 234 662 B1 | 12/2006 |

* cited by examiner

A

B

C

D

E

F

US 7,723,010 B2

REACTIVE NEAR INFRARED ABSORBING POLYMERIC PARTICLES, METHODS OF PREPARATION AND USES THEREOF

CROSS REFERENCE TO RELATED APPLICATIONS

This application claims the benefit, under 35 U.S.C. §119 (e), of U.S. provisional application Ser. No. 60/823,415 filed on Aug. 24, 2006, which is incorporated herein by reference in its entirety.

FIELD OF THE INVENTION

This invention relates to polymeric particles useful for lithographic plate coatings and to plates and coatings containing these particles. More specifically, these new polymeric particles and coatings are useful in the preparation of lithographic offset printing plates for direct digital imaging by near-infrared laser radiation.

BACKGROUND OF THE INVENTION

On-press developable negative-working lithographic offset printing plates are known in the prior art. For example, U.S. Pat. No. 5,569,573 teaches lithographic printing plates comprising a laser imaging layer containing microencapsulated oleophilic materials in hydrophilic polymer binders.

EP 0 770 495 teaches lithographic printing plates comprising near infrared absorbing materials, polymer binders and thermoplastic particles capable of coalescing under heat.

U.S. Pat. No. 6,983,694 teach on-press developable negative-working offset printing plates coated with near infrared sensitive coating compositions comprising thermoplastic polymeric particles, such as polystyrene or poly(acrylonitrile-co-styrene) particles, non-reactive hydrophilic polymer binder and near infrared absorption dyes.

U.S. Pat. No. 6,261,740 teaches negative-working offset printing plates coated with near infrared sensitive coating compositions containing methoxymethacrylamide copolymers, phenolic resins, iodonium salts and near infrared absorption dyes.

U.S. Pat. Nos. 6,124,425 and 6,177,182 teach on-press developable negative-working offset printing plates coated with thermally reactive near-infrared absorbing copolymers, which undergo cross-linking reactions via cationic polymerization upon exposure to near infrared radiation. The near infrared chromophoric moieties are functionalized to the polymeric backbone via ether and ammonium bonds. These near infrared absorbing polymers are prepared as homogenous solutions.

U.S. Pat. No. 6,960,422 teaches to prepare negative-working offset printing plates, which contain a near infrared sensitive base-coat compositions comprising molecular near infrared dyes, radical generators, radical polymerizable urethane compounds, reactive polymer binders and other additives.

EP patent No. 1234662 teaches to prepare negative-working offset printing plates, the coating compositions of which contain a near infrared absorber, onium initiators and urethane polymers comprising poly(ethylene oxide) side chains. These urethane polymers do not absorb near infrared radiation.

U.S. Pat. Nos. 6,969,575 and 7,001,704 teach on-press developable negative-working offset printing plates having an image-forming layer, which comprise near infrared absorbing microcapsules and acid generator compound.

Similarly, U.S. Pat. Nos. 7,001,673 and 7,078,145 teach to prepare on-press developable negative-working offset printing plates. The coating compositions comprise near infrared absorbing microcapsules, which were prepared via emulsification with a high speed homogenizer of the oil phase containing hydrophobic polymers, near infrared absorbers and initiators in hydrophilic polymer water solutions. The preparation of these microcapsules is complicated and these coatings exhibit poor scratch resistance and require an overcoat layer.

U.S. Pat. No. 6,037,102 and EP Application No. 1117005 teach to prepare negative-working photosensitive coating compositions comprising copolymers grafted with poly(ethylene oxide) side chains. These copolymers do not absorb near infrared radiation.

U.S. Pat. No. 6,582,882 teaches to prepare "graft" polymers and copolymers for use in offset printing plates comprising poly(ethylene oxide) side chains, which are grafted on non-crosslinked hydrophobic polymer backbone. These polymers do not absorb near infrared radiation.

U.S. Pat. No. 6,899,994 and co-pending US patent applications No. 2003/0157433; 2003/0064318 and 2005/0123853 teach on-press developable negative-working offset printing plates, which are coated with thermally imageable compositions containing polymer binders, initiator systems and polymerizable components. The described polymer binders are non-crosslinked copolymers having polyethylene oxide and polypropylene block, or graft copolymers co-polymerized with hydrophobic monomers, such as styrene, substituted styrene, alpha-methylstyrene, acrylate ester, methacrylate ester, acrylonitrile, acrylamide, methacrylamide, vinyl halide, vinyl ester, vinyl ether and an alpha-olefin. The polymerizable components are viscous liquid oligomers containing multiple acrylic and methacrylic functional groups. The initiator system contains near infrared absorption dyes and radical producing compounds, such as triazine and iodonium salts.

All of these coating compositions and printing plates show some disadvantages such as having a tacky surface, which causes difficulties for handling and storage, exhibiting phase separation and/or surface crystallization upon storage, requiring high laser power to achieve imaging, having poor substrate adhesion and consequently failing to provide sufficient run length on press, not being developable on-press due to dye staining causing background toning, exhibiting poor scratching resistance, requiring an over-coating layer and/or a special substrate surface treatment and being expensive or difficult to manufacture.

There thus remains a need for new materials and new coatings for lithographic plates that would overcome some or all of the drawbacks of the prior art.

The present description refers to a number of documents, the content of which is herein incorporated by reference in their entirety.

SUMMARY OF THE INVENTION

This invention firstly relates to a polymeric particles having a particle size between about 60 nm and about 1000 nm and comprising a polymer. This polymer comprises (a) a hydrophobic backbone, (b) a near infrared absorbing segment having attached thereto a near infrared absorbing chromophore having an absorption peak between about 700 nm and about 1100 nm; and (c) a near infrared transparent segment.

In embodiments, the polymeric particle may have a particle size between about 200 nm and 600 nm. Also, in embodiments, the polymer may have a molecular weight of about 3000 Dalton or more.

In specific embodiments, the polymer may have the following structure:

—[G1]$_a$—[G2]$_b$, wherein

G1 represents the absorbing segment;
G2 represents the transparent segment;
G1 and G2 form the hydrophobic backbone;
a and b independently represent molar ratios between 0.01 and 0.99; and
the chromophore is covalently or electrostatically attached to the hydrophobic backbone as a pendant group.

In embodiments, the absorbing segment may comprise:

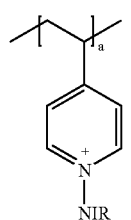 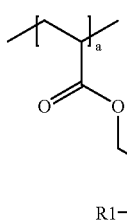

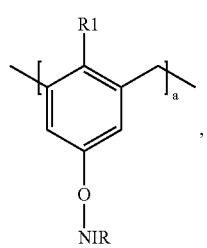 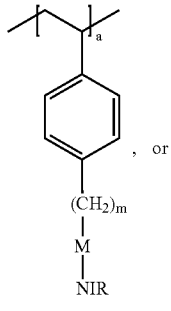

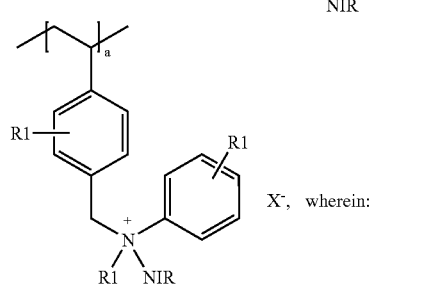

NIR represents the chromophore;
R1 represents hydrogen or $C_1$-$C_{18}$ alkyl;
X represents a bromide, chloride, iodide, tosylate, triflate, trifluoromethane carbonate, dodecyl benzosulfonate, tetraphenylborate, alkyl-triphenylborate, tetrafluoroborate or hexafluoroantimonate anionic counter ion;
M represents oxygen, sulfur, or dialkylamino;
a represents a molar ratio between 0.01 and 0.99; and
m represents a number repeating units between 1 and 5.

In other embodiments, the absorbing segment may comprise a polyether linker covalently attaching the chromophore to the polymer backbone. More specifically, the absorbing segment may comprise:

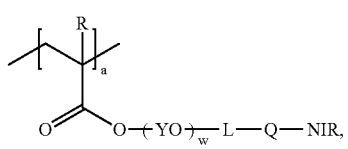

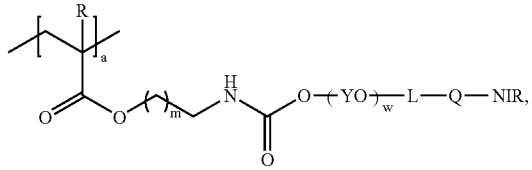

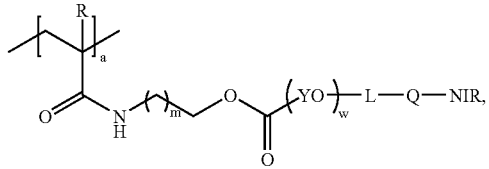

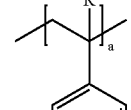

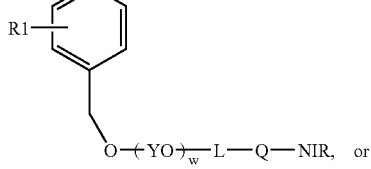

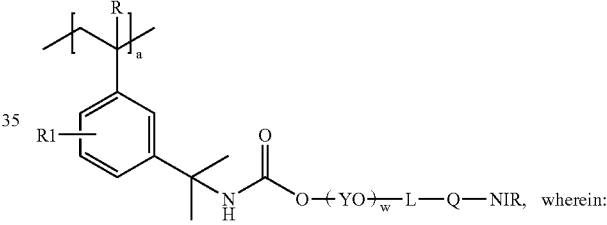

a represents a molar ratio between 0.01 and 0.99;
R represents hydrogen or methyl;
R1 represents $C_1$-$C_8$ alkyl or $C_1$-$C_8$ alkyloxy;
w represents a number of repeating units between 10 and 50;
m represents a number of repeating units between 1 and 10;
Y represents a linear or branched $C_2$-$C_4$ alkyl;
Q represents a spacer group;
NIR represents the chromophore; and

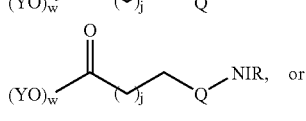

L represents

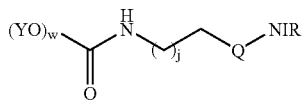

wherein the Q-NIR and the (YO)$_w$ groups are indicated for clarity and j represents a number of repeating unit between 0 and 10.

In more specific embodiments, the spacer group may be:

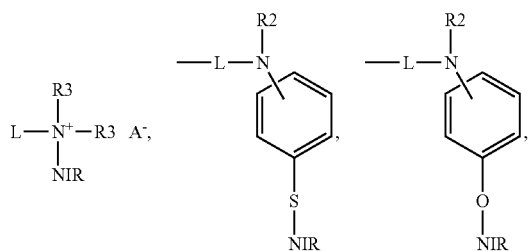

wherein the L and NIR groups are indicated for clarity, R2 represents $C_1$-$C_8$ alkyl or $C_1$-$C_8$ alkyloxy; R3 is the same as R2 or a phenyl ring substituted by H or R2; and A represents an anion. In embodiments, this anion may be bromide, chloride, iodide, tosylate, tetraphenylborate, alkyl triphenyl borate, tetrafluoro borate, or hexafluoroantimonate.

In specific embodiments, two polymer backbones of the polymer particles are cross-linked via two absorbing segments and one chromophore.

In other embodiments, the chromophore may be:

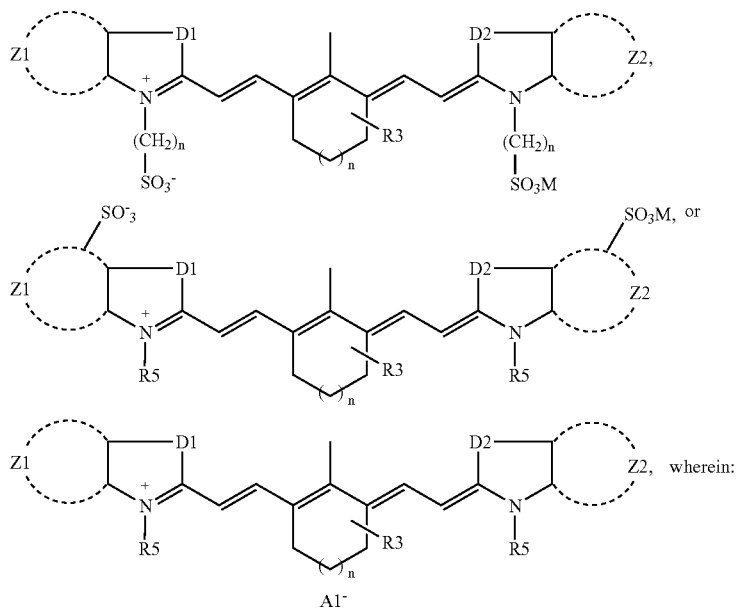

-continued

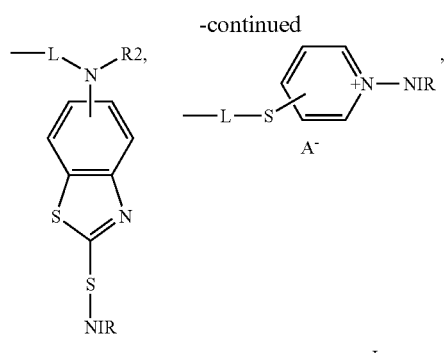

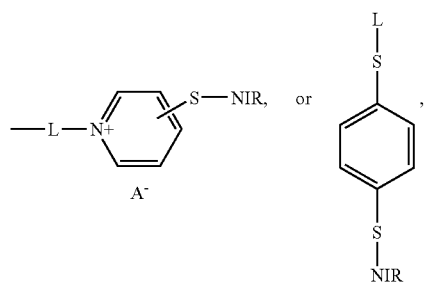

D1 and D2 each independently represent —O—, —S—, —Se—, —CH=CH—, or —C(CH$_3$)$_2$;

Z1 and Z2 each independently represent one or more fused substituted or unsubstituted aromatic ring;

h represents an integer between 2 and 8;

n represents 0 or 1;

M represents hydrogen or a Na, K, or tetraalkylammonium salt cationic counter ion.

A1 represents a bromide, chloride, iodide, tosylate, triflate, trifluoromethane carbonate, dodecyl benzosylfonate, tetrafluoroborate, tetraphenylborate or triphenyl-n-butylborate anionic counter ion;

R3 represents hydrogen or alkyl; and

R4 and R5 each independently represent alkyl, aryl alkyl, hydroxy alkyl, amino alkyl, carboxy alkyl, sulfo alkyl, acetoxyl alkyl, polyether or a polymerizable substituent of formula:

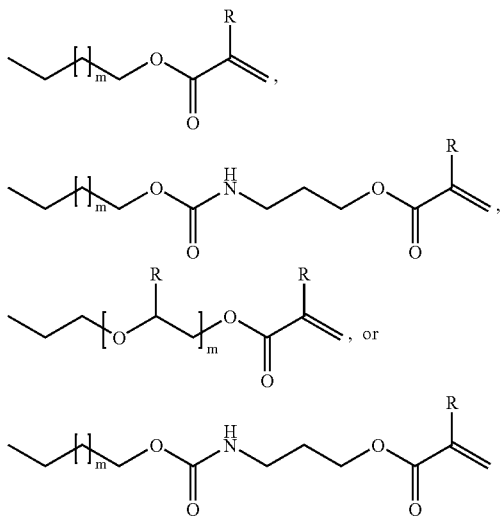

wherein m represents a number of repeating unit between 0 and 50 and R is hydrogen or methyl.

In embodiments, the transparent segment may comprise styrene, substituted styrene, alpha-methylstyrene, 4-vinylphenol, 3-vinylbenzaldehyde, acrylate ester, methacrylate ester, acrylonitrile, acrylamide, methacrylamide, vinyl halide, vinyl ester, vinyl ether, 9-vinylcarbazole, or vinyl phosphoric acid transparent monomeric units, and mixtures thereof.

In other embodiments, the transparent segment may comprise transparent monomeric units obtained by polymerizing polyether monomers of formula: $H_2C=C(R)-COO-(YO)_w-Y-T$, $H_2C=C(R)-COO-CH_2CH_2-NHCO-O(CH_2CH_2O)_w-CH[CH_2-(OCH_2CH_2)_w-Y-T]_2$, or mixtures thereof, wherein:
  R represents hydrogen or methyl;
  Y represents $C_2-C_4$ alkyl;
  w represents a number repeating unit between 5 and 50; and
  T represents a hydroxy, alkoxy, aryloxy, carboxylic acid, sulfonic acid, or phosphoric acid terminating group and their salts.

In embodiments, the transparent segment may comprise:
  poly(ethylene glycol) (meth)acrylate,
  poly(propylene glycol) (meth)acrylate,
  poly(ethylene glycol-block-propylene glycol) (meth)acrylate,
  poly(ethylene glycol-block-caprolactone) (meth)acrylate,
  poly(ethylene glycol) alkyl ether (meth)acrylate,
  poly(propylene glycol) alkyl ether (meth)acrylate,
  poly(ethylene glycol-block-propylene glycol) alkyl ether (meth)acrylate,
  poly(ethylene glycol-block-caprolactone) alkyl ether (meth)acrylate transparent monomeric units, or mixtures thereof.

In embodiments, the transparent segment may comprise one or more transparent monomeric units obtained by polymerizing a monomer having two polymerizable functional groups, thereby crosslinking two polymer backbones via one transparent monomeric unit.

In more specific embodiments, the monomer having two polymerizable functional groups may be:
  divinyl benzene,
  poly(ethylene glycol) di(meth)acrylate,
  poly(propylene glycol) di(meth)acrylate,
  poly(ethylene glycol-ran-propylene glycol) di(meth)acrylate,
  poly(propylene glycol)-block-polycaprolactone di(meth)acrylate,
  poly(ethylene glycol)-block-polytetrahydrofuran di(meth)acrylate,
  glycerol-ethoxylate-di(meth)acrylate,
  glycerol ethoxylate di(meth)acrylate, or mixtures thereof.

The present invention also relates to a method of manufacturing polymeric particles. The method comprises (a) providing a near infrared absorbing chromophore, a first and a second polymerizable monomers; wherein the second monomer and the chromophore comprise suitable functional groups to become attached together; polymerizing the monomers in a hydrophilic medium in the presence of an initiator, thereby producing polymeric particles; and attaching the chromophore to the second monomer on the surface of the polymeric particles.

In embodiments of this method, the chromophore may be attached to the second monomer through a covalent bond. Alternatively, the chromophore may be attached to the second monomer through an electrostatic interaction.

In specific embodiments, the initiator may be 2,2'-azobisisobutyronitrile, ammonium persulfate, benzoyl peroxide, or copper bromide.

In embodiments, the hydrophilic medium may be water, alcohol, acetonitrile, ketone or mixtures thereof.

The present invention also relates to a coating composition comprising the polymeric particles of the invention and a reactive iodonium oligomer.

In embodiments, the coating composition may comprise between about 10 and about 90% by solid weight of polymeric particles. Also, the coating composition may comprise between about 10 and about 80% by solid weight of the reactive iodonium oligomer. In specific embodiments, the reactive iodonium oligomer may be Tuxedo® 06C051A Photopolymer.

Also, in embodiments, the coating composition may further comprise a polymer binder. More specifically, the coating composition may comprise between about 2 and about 40% by solid weight of the polymer binder. In specific embodiments, the polymer binder may be Tuxedo® XCP10 or Tuxedo® XAP02.

In embodiments, the coating composition may further comprise a colorant, a stabilizer, a sensitizer or mixtures thereof. The coating composition may comprise between about 0.5 and about 10% by solid weight of the colorant, stabilizer, sensitizer or mixtures thereof.

The present invention also relates to a negative-working lithographic offset printing plate comprising (a) a substrate; (b) a hydrophilic under layer; and (c) a laser imageable upper layer, wherein the laser imageable upper layer comprises the polymeric particles of the invention. More specifically, the laser imageable upper layer may comprise the coating composition of the invention as described above.

DETAILED DESCRIPTION OF THE INVENTION

Near Infrared Absorbing Polymeric Particles

Turning now to the present invention in more details, there is provided near infrared absorbing polymeric particles comprising a polymer having at least one absorption peak between 700 and 1100 nm (i.e. in the near infrared region) and methods of manufacture and uses thereof.

More specifically, the polymer comprised in the near infrared absorbing polymeric particles of this invention has a hydrophobic polymeric backbone and comprises at least one near infrared absorbing segment and at least one near infrared transparent segment.

As used herein, a near infrared absorbing segment is a segment of a polymer comprising one or more near infrared absorbing monomeric unit. Similarly, a near infrared transparent segment is a segment of a polymer comprising one or more near non-thermally reactive infrared transparent monomeric unit.

As used herein, the "backbone" of a polymer is the series of covalently bonded atoms that together create the continuous chain of the polymer.

In this polymer, the near infrared absorbing segments, i.e. at least some of the absorbing monomeric units comprised in it, have attached thereto at least one near infrared absorbing chromophore, i.e. a chromophore having at least one absorption peak between 700 and 1100 nm. As explained above, the transparent segments comprise one or more non-thermally reactive near infrared transparent monomeric units.

The near infrared absorbing polymeric particles have a particle size between 60 and 1,000 nm. In specific embodiments, the near infrared absorbing polymeric particles of this invention may have a particle size between 200 and 600 nm.

In use the near infrared absorbing segments absorb incoming near infrared radiation and produce heat, which causes the coalescence of the polymeric particles. As used herein, "coalescence" refers to the process by which adjacent polymer particle contact and fuse When the polymer particles are used in coating compositions of the invention, these segments also sensitize the reactive iodonium oligomers present in the coatings to generate free radicals. Without being bound by theory, it is believed that this is probably due to a hemolytic cleavage reaction. The generated free radicals then initiate the reactive functional groups (for example, acrylate and methacrylate) of the reactive iodonium oligomers and of the polymer binders, if present, to undergo crosslink reactions.

The coalescence of the polymeric particles and the cross-linking reactions of the reactive iodonium oligomers and, if present, the polymer binders make the exposed areas of the coating cohesively stronger; causing them to adhere better to the substrate. Coatings comprising of the near infrared absorbing polymeric particles of the invention are therefore particularly advantageous for on-press development, but are not limited to this sole application.

In contrast, the near infrared transparent segments are transparent to near infrared radiation, which means that they do not specifically react, either chemically or physically, upon exposure to such radiation. In other words, these segments are non-thermally reactive. They experience the coalescence of the polymeric particles, but they are not the driving force or the cause of such coalescence or of any other physical or chemical changes due to exposition to near infrared radiation.

In embodiments, the molecular weight of the polymer may be greater than or equal to about 3,000 Dalton.

In embodiments, the near infrared chromophores may be covalently attached to the backbone of the polymer or attached to it through electrostatic interaction. As used herein, "covalently attached" means linked by a covalent bond. A covalent bond is a well-known form of chemical bonding that is characterized by the sharing of pairs of electrons between atoms. As used herein, "attached through electrostatic interaction" means linked by an ionic bond. An ionic bond is a well-known type of chemical bond based on electrostatic forces between two oppositely-charged ions.

The general chemical structure of the polymer comprised in the near infrared absorbing polymeric particles of this invention may be:

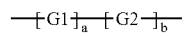

wherein:
G1 represents the near infrared absorbing segment;
G2 represents the non-thermally reactive, i.e. near infrared transparent segment; and
G1 and G2 form the hydrophobic backbone;
a and b independently represent molar ratios, which may vary between 0.01 and 0.99; and
the chromophore is covalently bonded or electrostatically attached to the hydrophobic backbone as a pendant group.

As used herein, a "pendant group", also called side group, is a group of atoms attached to a backbone chain of a long molecule, such as a polymer.

Near Infrared Absorbing Segments:

The near infrared absorbing segments of this invention may be obtained as described for the "near infrared absorption segment E" in U.S. Pat. Nos. 6,124,425 and 6,177,182, which are incorporated herein as references.

In specific embodiments, the near infrared absorbing chromophores may be attached to the polymer backbone via covalent bonds, such as in the followings near infrared absorbing segments:

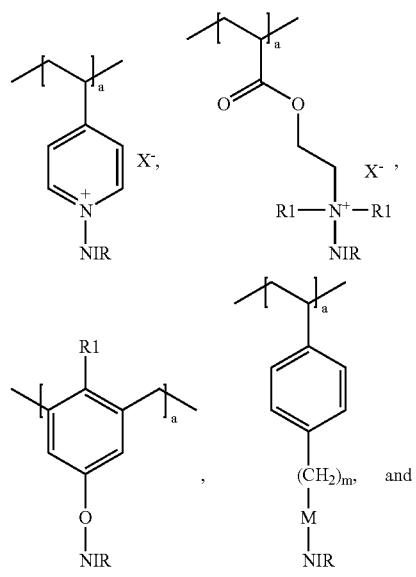

-continued

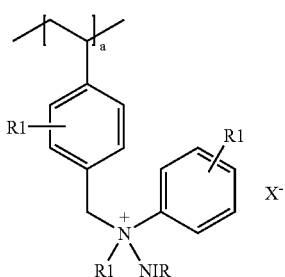

wherein:

NIR represents a near infrared absorbing chromophore;

R1 represents hydrogen or alkyl with 1 to 18 carbon atoms;

X represents a bromide, chloride, iodide, tosylate, triflate, trifluoromethane carbonate, dodecyl benzosulfonate, tetraphenylborate, alkyl-triphenylborate, tetrafluoroborate or hexafluoroantimonate anionic counter ion;

M represents oxygen, sulfur, or dialkylamino;

a represents a molar ratio, which may vary between 0.01 to 0.99; and m represents a number repeating units, which may vary from 1 to 5.

In other embodiments, the near infrared absorbing chromophores may be attached to the polymer backbone via a polyether linker. Non limiting examples of near infrared absorbing segments containing such polyether linker include:

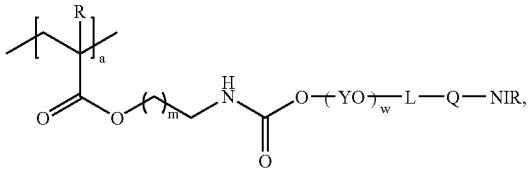

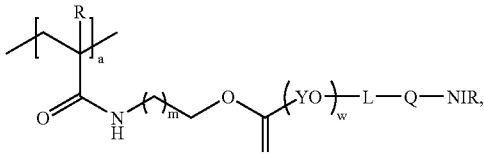

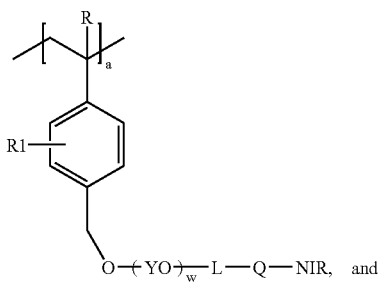

-continued

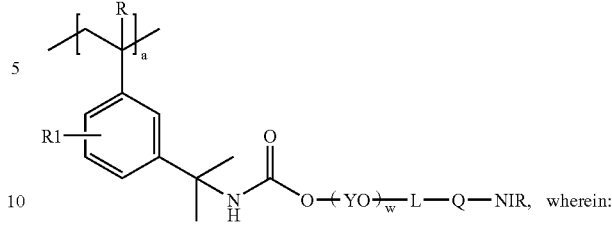 wherein:

a represents a molar ratio, which may vary between 0.01 to 0.99;

R represents an hydrogen atom or a methyl group;

R1 represents a $C_1$-$C_8$ alkyl or a $C_1$-$C_8$ alkyloxy;

w represents a number of repeating units, which may vary between 10 and 50;

m represents a number of repeating units, which may vary between 1 and 10;

Y represents a linear or branch alkyl with 2 to 4 carbon;

L represents a divalent linker, which may have the following structures wherein the Q-NIR and the $(YO)_w$ groups are also indicated for clarity and wherein j represents the number of repeating unit, which may vary from 0 to 10:

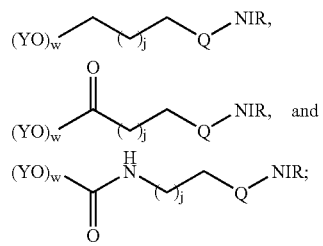

Q represents a spacer group linking the near-infrared absorbing chromophore to the divalent linker; and NIR represents a near infrared absorbing chromophore.

In more specific embodiments, the Q spacer group may have the following structures, wherein the L and NIR groups are also indicated for clarity:

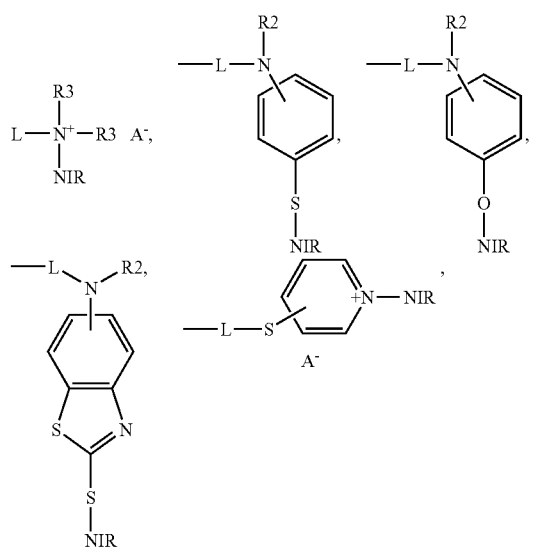

-continued

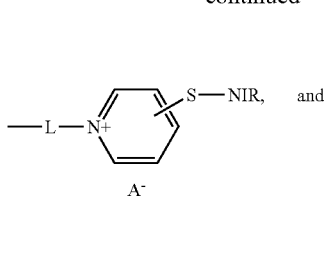

wherein R2 represents $C_1$-$C_8$ alkyl chain or $C_1$-$C_8$ alkyloxy chain; R3 is the same as R2 or a phenyl ring substituted by H or R2; and A represents anion. In even more specific embodiments, the anion A may be bromide, chloride, iodide, tosylate, tetraphenylborate, alkyl triphenyl borate, tetrafluoro borate, or hexafluoroantimonate.

The near infrared absorbing chromophore (NIR) attached to the absorbing segments may have the following structures:

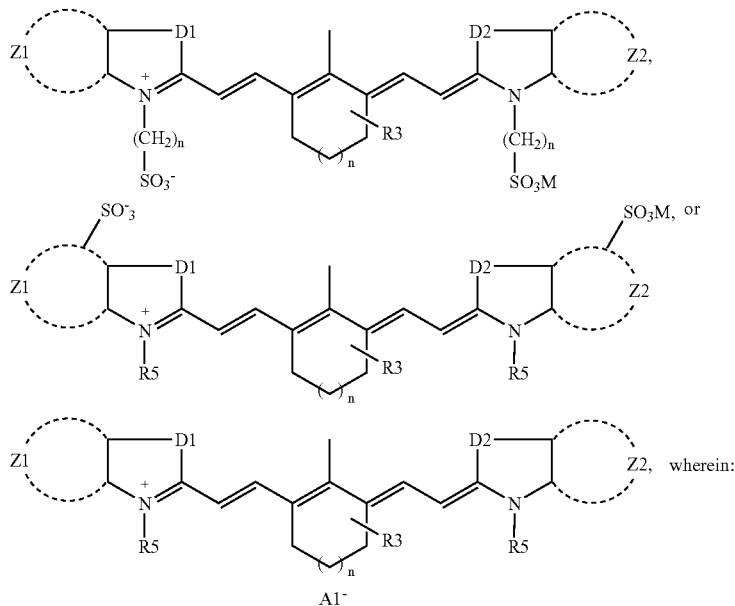

wherein:
  D1 and D2 are each independently —O—, —S—, —Se—, —CH=CH—, and —C(CH$_3$)$_2$;
  Z1 and Z2 each independently represent one or more fused substituted or unsubstituted aromatic ring;
  h may vary from 2 to 8;
  n represents 0 or 1;
  M represents hydrogen or a cationic counter ion selected from Na, K, and tetraalkylammonium salts.
  A1 represents a bromide, chloride, iodide, tosylate, triflate, trifluoromethane carbonate, dodecyl benzosylfonate and tetrafluoroborate, tetraphenylborate or triphenyl-n-butylborate anionic counter ion.
  R3 and R7 each independently represent hydrogen or alkyl; and R4 and R5 each independently represent alkyl, aryl alkyl, hydroxy alkyl, amino alkyl, carboxy alkyl, sulfo alkyl, acetoxyl alkyl, polyether or a polymerizable substituent of formula:

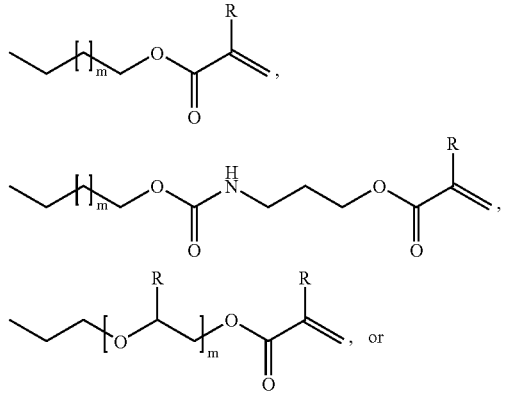

-continued wherein m represents a number of repeating unit, which may vary between 0 and 50; and R is hydrogen or methyl.

In embodiments of the polymeric particles of the invention, crosslinking between two polymer backbones may happen via two near infrared absorbing segments and one near infrared absorbing chromophore as in Example 10 (FIG. 34). In this case, the NIR chromophore must be part of two near infrared absorbing segments and therefore must allow for two covalent links. An example of such a NIR chromophore is:

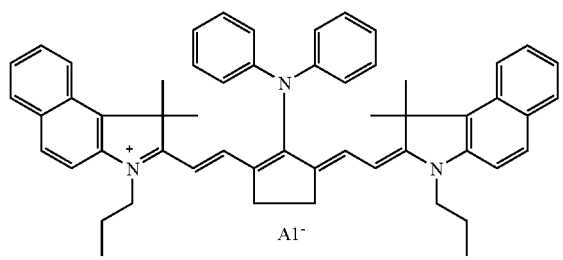

wherein A1 is a counter-ion. In specific embodiments, this counter-ion may be bromide, chloride, iodide, tosylate, triflate, trifluoromethane carbonate, dodecyl benzosylfonate and tetrafluoroborate, tetraphenylborate or triphenyl-n-butylborate.

As used herein, a "cross-link" is a covalent bond linking one polymer backbone to another.

In specific embodiments, the near infrared absorbing segments may be as illustrated in FIGS. 1-10, wherein R is hydrogen or methyl, a is molar ratio varying between 0.1 and 0.9, w is a number of monomer unit that may vary between 5 and 70, R4 and R5 are as described above for the NIR chromophore and A1 is a counter-ion. In specific embodiments, this counter-ion may be bromide, chloride, iodide, tosylate, triflate, trifluoromethane carbonate, dodecyl benzosylfonate and tetrafluoroborate, tetraphenylborate or triphenyl-n-butylborate.

Near Infrared Transparent Segment:

The near infrared transparent segments may be obtained by polymerization of one or more of the following co-monomers: styrene, substituted styrene, alpha-methylstyrene, 4-vinylphenol, 3-vinylbenzaldehyde, acrylate ester, methacrylate ester, acrylonitrile, acrylamide, methacrylamide, vinyl halide, vinyl ester, vinyl ether, 9-vinylcarbazole, and vinyl phosphoric acid.

Also, near infrared transparent segments may be obtained from polymerization of linear or branch polyether monomers having the following general structures:

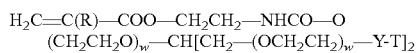

and mixtures thereof, wherein:
R represents an hydrogen atom or a methyl group;
Y represents an alkyl chain with 2 to 4 carbon atoms;
w represents a number repeating unit, which may vary between 5 and 50; and
T represents a hydroxy, alkoxy, aryloxy, carboxylic acid, sulfonic acid, or phosphoric acid terminating group and their salts.

More specifically, the near infrared segment may comprise one or more of:
poly(ethylene glycol) (meth)acrylate,
poly(propylene glycol) (meth)acrylate,
poly(ethylene glycol-block-propylene glycol) (meth)acrylate,
poly(ethylene glycol-block-caprolactone) (meth)acrylate,
poly(ethylene glycol) alkyl ether (meth)acrylate,
poly(propylene glycol) alkyl ether (meth)acrylate,
poly(ethylene glycol-block-propylene glycol) alkyl ether (meth)acrylate, or
poly(ethylene glycol-block-caprolactone) alkyl ether (meth)acrylate.

Near infrared transparent segments may also be obtained by polymerization of one or more monomers having two polymerizable functional groups, which can form an interchain crosslink network. Non limiting examples of such monomers include:
divinyl benzene,
poly(ethylene glycol) di(meth)acrylate,
poly(propylene glycol) di(meth)acrylate,
poly(ethylene glycol-ran-propylene glycol) di(meth)acrylate,
poly(propylene glycol)-block-polycaprolactone di(meth)acrylate,
poly(ethylene glycol)-block-polytetrahydrofuran di(meth)acrylate,
glycerol-ethoxylate-di(meth)acrylate, and
glycerol ethoxylate di(meth)acrylate.

Examples of polymers crosslinked through their near infrared transparent segments can be found in FIGS. 11-13, wherein a and b are molecular ratios, which may vary between 0.01 and 0.99; k, h and l are molecular ratios which may vary between 0.02 and 0.098; and m and w are number of repeating units, which may vary between 5 and 50.

Both types of crosslinking, i.e. crosslinking via two near infrared absorbing segments and one near infrared absorbing chromophore and crosslinking via a near infrared transparent segment, may be present simultaneously.

Methods of Manufacture:

The present invention also relates to methods of manufacture of the above-mentioned near infrared absorbing polymeric particles.

The near infrared absorbing polymeric particles can be made using an one-pot synthesis, in which the particles are prepared by free radical, ionic or atom transfer polymerization of monomers in a hydrophilic medium, such as water, alcohol, acetonitrile, ketone or mixtures thereof, using corresponding initiators. Near infrared absorbing chromophores are then grafted onto the surface of the polymeric particles via covalent bonding.

More specifically, the polymeric particles may be manufactured by: (A) providing a near infrared absorbing chromophore, a first and a second polymerizable monomers; wherein said second monomer and said chromophore comprise suitable functional groups to become attached together; (B) polymerizing said first and second monomers in a hydrophilic medium in the presence of an initiator, thereby producing polymeric particles; and (C) attaching said chromophore to said second monomer on the surface of said polymeric particles.

Initiators are compounds that initiate the polymerization reaction. Any initiator known to the person of skill in the art to be suitable for use in the present method may be used. It is well within the skill of the person skilled in the art to select and use such initiators for the present polymerization reactions. Non limiting examples of initiators are 2,2'-azobisisobutyronitrile, ammonium persulfate, benzoyl peroxide, and copper bromide.

Coating Compositions:

The present invention also relates to coating compositions for use in the manufacture of negative-working laser imageable lithographic offset printing plates.

More specifically, the present invention relates to coating compositions comprising (a) the above-mentioned near infrared absorbing polymeric particles, (b) reactive iodonium oligomers, and optionally (c) reactive polymer binders and (d) colorants and stabilizers.

The composition of the invention may comprise between about 10 and about 80% by solid weight of polymeric particles and between about 10 and about 80% by solid weight of iodonium oligomers. When present, the polymer binders may represent between about 2 and about 40% by solid weight of the composition. The colorants and stabilizers may each represent between about 0.5 and about 10% by solid weight of the composition.

Reactive Iodonium Oligomers:

The reactive iodonium oligomers are iodonium salts comprising one or more functional groups, which can undergo radical and/or cationic polymerization. More specifically, the iodonium salts may contain radical polymerizable groups, such as acrylate, methacrylate and vinyl ether. These radical polymerizable groups may be substituted to the aryl rings of the iodonium salt via urethane and/or urea bonds. The structures of such polymerizing iodonium oligomers are disclosed in the U.S. provisional patent application No. 60/747,474, which is incorporated herein as reference.

More specifically, the reactive iodonium oligomers may be those commercially available from American Dye Source, Canada under trade name Tuxedo® 06C051A Photopolymer.

This product is prepared by heating 137 grams of 1,3-dioxolane solution containing 245 grams of Desmodur™ N100 (available from Bayer Canada), 310 grams of poly(ethylene glycol) acrylate (Mn~375, available from Sigma-Aldrich, Canada), 244 grams of pentaerythritol triacrylate (SR-444, available from Sartomer, USA), 1 gram of hydroquinone (available from Sigma-Aldrich, Canada), 10 grams of Irganox 1035 (available from Ciba Specialty Chemicals, Switzerland) and 1 gram of dibutyl tin dilaurate (available from Sigma-Aldrich, Canada) to 60° C. under an oxygen atmosphere and constant stirring for 10 hours. A sample of reaction mixture was withdraw from the reaction flask and its FTIR spectrum, recorded on KBr pellet, showed a —N=C=O peak at 2274 cm$^{-1}$. Then, 75 grams of [4-(2-hydroxy-1-tetradecyloxy)phenyl]phenyliodonium tetraphenylborate (available from American Dye Source Inc., Canada) was slowly added into the reaction mixture, which was stirred at 60° C. for an additional 6 hours. A sample of reaction mixture was withdraw from the reaction flask and its FTIR spectrum, recorded on KBr pellet, showed a —N=C=O peak at 2274 cm$^{-1}$. Then, 100 grams of dipentaerythritol pentaacrylate (SR-399 available from Sartomer, USA) were added to the reaction mixture, which was continued to stir at 60° C. for additional 3 hours. A sample of reaction mixture was withdraw from the reaction flask and its FTIR spectrum, recorded on KBr pellet, did not show a —N=C=O peak at 2274 cm$^{-1}$, which indicated that the reaction was completed. A clear viscous product was obtained, which was adjusted with 1,3-dioxolane to have 85% solid weight solution. The possible idealized chemical structures of this reactive iodonium oligomer are shown in FIGS. 14 to 19.

Polymer Binders:

Polymer binders used in the compositions of this invention provide good film forming properties and solubility in aqueous solutions having pH between 2 and 14.

More specifically, the polymer binders may be cellulose polymers having non-ionic pendant groups, such as hydroxy, polyethylene oxide, polypropylene oxide or polybutylene oxide. The cellulose polymers may contain anionic pendant groups, such as carboxylic acid, sulfonic acid, phosphoric acid, and their corresponding lithium, sodium and potassium alkali salts. The cellulose polymers may contain cationic pendant groups, such as tetra-alkyl-ammonium salts. The cellulose polymers may contain reactive functional groups, such as acrylate, methacrylate and vinyl ether, which can undergo crosslink reaction via free radical polymerization.

The cellulose polymer binder may be that commercially available from American Dye Source, Inc. (Canada) under the trade-name Tuxedo® XCP10, which has the idealized chemical structure shown in FIG. 20.

The methacrylate containing cellulose polymer Tuxedo® XCP10 Photopolymer was prepared by heating 90 grams of 1,3-dioxolane dissolving containing 9.0 grams of hydroxypropyl cellulose (Klucel E, available from Aqualon, USA) and 0.1 grams of dibutyl tin dilaurate (available from Sigma-Aldrich, Canada) at 60° C. under stirring and oxygen atmosphere. One gram of 2-isocyanatoethyl methacrylate (available from Sigma-Aldrich, Canada) was slowly added into the reaction and it was continued to stir at 60° C. for 3 hours. A sample of reaction mixture was withdraw from the reaction flask and its FTIR spectrum, recorded on KBr pellet, did not show a —N=C=O peak at 2274 cm$^{-1}$, which indicated that the reaction was completed. A clear viscous product was obtained having 10% solid weight.

The polymer binders may also be water soluble acetal copolymers having 4-hydroxyphenyl, 3-hydroxyphenyl, 2-hydroxyphenyl, alkyl, and hydroxy functional groups. In embodiments, the alkyl may be liner or branched alkyl having between 1 and 12 carbon atoms. The acetal copolymers may also comprise free radical reactive functional groups, such as acrylate and methacrylate.

The water soluble acetal copolymer binder may be that commercially available from American Dye Source, Inc. (Canada) under the trade-name Tuxedo® XAP02, which has the idealized chemical structure shown in FIG. 21, wherein a=0.02, b=0.18, c=0.78 and d=0.02.

The water soluble acetal copolymer Tuxedo® XAP02 Photopolymer was synthesized by heating 220 grams of dimethylsulfoxide solution containing 44.0 grams of polyvinyl alcohol (Celvol 103, available from Celanese, USA) at 60° C. under constant stirring and nitrogen atmosphere. Concentrated sulfuric acid (1.0 gram) was added into the solution as a catalyst. Thirty minutes later, 12.2 grams of 4-hydroxybenzaldehyde was slowly added into the reaction mixture. The reaction was continued at 60° C. for 20 hours. The acetal copolymer was obtained by precipitation in acetone, and then air dried until constant weight. One and half grams of 2-isocyanatoethyl methacrylate (available from Sigma-Aldrich, Canada) and 5 drops of dibutyl tin dilaurate were slowly added into 150 grams of dimethylsulfoxide dissolving with 48.5 grams of the above obtained acetal copolymer. The reaction was stirred at 60° C. under oxygen atmosphere for 3 hours. A sample of reaction mixture was withdraw from the reaction flask and its FTIR spectrum, recorded on KBr pellet, did not show a —N=C=O peak at 2274 cm$^{-1}$, which indicated that the reaction was completed. The Tuxedo® XAP02 Photopolymer was obtained by precipitation in acetone, which was then filtered and air dried until constant weight.

Colorant and Stabilizers:

Optionally, the coatings of the invention may also comprise colorants to provide good image printout after laser imaging. Any colorant known to the person of skill in the art to be suitable for use in the present composition may be used. These colorants may be, for example, Victoria blue BO, crystal violet, malachite green and their derivatives. Also, these colorants may be color formers, which may be the derivatives of triarylpyridine, xanthene and isobenzofuranone. These color-generating compounds may be colorless and then become colored or change from a first color to another color in the presence of free radical or acid. More specifically, these compounds may be:

- 3',6'-bis[N-[2-chlorophenyl]-N-methylamino]spiro[2-butyl-1,1-dioxo[1,2-benzisothiazole-3(3H), 9'-(9H)xanthene]](prepared by the method of U.S. Pat. No. 4,345,017);
- 3',6'-bis[N-[2-[methanesulfonyl]phenyl]-N-methylamino]spiro[2-butyl-1,1-dioxo[1,2-benzisothiazole-3(3H), 9'-(9H)xanthene]] (prepared by the method of U.S. Pat. No. 4,345,017);
- 9-Diethylamino[spiro[12H-benzo(a)xanthene-12,1'(3'H)-isobenzofuran)-3'-one] (available from BF Goodrich, Canada);
- 2'-di(phenylmethyl)amino-6'-[diethylamino]spiro[isobenzofuran-1(3H), 9'-(9H)-xanthen]-3-one (available from BF Goodrich, Canada);
- 3-[butyl-2-methylindol-3-yl]-3-[1-octyl-2-methylindol-3-yl]-1-(3H)-isobenzo furanone (available from BF Goodrich, Canada);
- 6-[dimethylamino]-3,3-bis[4-dimethylamino]-phenyl-(3H)-isobenzofuranone (available from BF Goodrich, Canada);
- 2-[2-Octyloxyphenyl]-4-[4-dimethylaminophenyl]-6-phenylpyridine (available from BF Goodrich, Canada);
- 3-(4-Diethylamino-2-ethoxyphenyl)-3-(1-ethyl-2-methylindol-3-yl)-4-azaphthalide (Blue-63, available from Yamamoto Chemicals, Inc., Japan);
- 3-(4-Diethylaminophenyl)-3-(1-ethyl-2-methylindol-3-yl)phthalide (Blue-502, available from Yamamoto Chemicals, Inc., Japan);
- 3-(2-Ethoxy-4-diethylaminophenyl)-3-(1-ethyl-2-methylindol-3-yl)phthalide (Blue-503, available from Yamamoto Chemicals, Inc., Japan);
- 3-[2,2-Bis(1-ethyl-2-methylindol-3-yl)vinyl]-3-(4-diethylaminophenyl) phthalide (GN169, available from Yamamoto Chemicals, Inc., Japan).
- 3,3-Bis(1-n-butyl-2-methylindol-3-yl)phthalide (Red-40, available from Yamamoto Chemicals, Inc., Japan); or
- Leucocrystal violet and leucomalachite green, which are available from Sigma-Aldrich, Canada.

The above color formers may be used in combination with sensitizers, such as the derivatives of triazine and arylbisimidazole. The sensitizers of this invention may be Triazine B, Triazine E, and orthochlorohexylarylbisimidazole. The combination of color formers and sensitizers may be used in the coatings of the present invention in quantities ranging from 0.5 to 5% by solid weight.

The coating compositions of the invention may also optionally comprise photo- and thermal stabilizers to prolong the shelf-life of the printing plates during storage and handling. These stabilizers may be methoxyphenol, hydroxyphenol, phenothiazine, 3-mercapto triazol, monomethyl ether hydroquinone, 2,4-dihydroxybenzophenone and other phenolic compounds, which are commercially available from Ciba Specialty Chemicals, such as Irganox 1035, Irganox 1010, and Irganox 565. These stabilizers may be used in the coatings of the present invention in quantities ranging from 0.5 to 5% by solid weight.

Negative-Working Lithographic Offset Printing Plates:

This invention also relates to negative-working lithographic offset printing plates, which comprise a substrate, a hydrophilic under layer and a laser imageable upper layer comprising the above-mentioned polymeric particles.

More specifically, the laser imageable upper layer may comprise the above-mentioned coating compositions.

The substrate may be brush or electrolytic grained aluminum, which is then anodized with phosphoric acid or a mixture of phosphoric and sulfuric acid. Also, the substrate may be polyester, which is coated with hydrophilic layer comprising silica, alumina or titanium oxide crosslinked with polymers, such as polyvinyl alcohol and polyvinyl acetal copolymers.

In embodiments, the hydrophilic under layer comprises water soluble polymers and/or copolymers of acrylic acid, methacrylic acid, vinyl phosphoric acid, poly(ethylene glycol) acrylate phosphoric acid terminated, poly(ethylene glycol) methacrylate phosphoric acid terminated, poly(ethylene glycol) acrylate carboxylic acid terminated, poly(ethylene glycol) methacrylate carboxylic acid terminated, poly(ethylene glycol) acrylate sulfonic acid terminated, or poly(ethylene glycol) methacrylate sulfonic acid terminated.

Unless otherwise noted, as used herein "alkyl" means linear or branched alkyl group having 1 to 12 carbon atoms and "aryl" means an aryl group having 5 to 12 carbon atoms.

Other objects, advantages and features of the present invention will become more apparent upon reading of the following non-restrictive description of specific embodiments thereof, given by way of example only with reference to the accompanying drawings.

DESCRIPTION OF SPECIFIC EMBODIMENTS

The present invention is illustrated in further details by the following non-limiting examples.

GLOSSARY

Glossary of the different chemicals used in the synthesis of the near infrared absorbing polymeric particles and coating formulations of the Examples.

Al Substrate:

The aluminum substrate was prepared by brush or electrolytic graining, anodizing with phosphoric acid. It was then washed with diluted water soluble polymer solutions and dried at 110° C. The water soluble polymers may be acrylic, methacrylic and vinylphosphoric acid polymers and copolymers thereof. For the examples herein included, the following water soluble polymers were used: polyacrylic acid (Colloid 140, available from Kemira, Pesssyvania, USA), poly(acrylic acid-co-vinyl phosphoric acid) (CP30, available from Rhodia, USA), and poly(acrylic acid-co-methacrylamide) (PAMA10, available from American Dye Source, Canada).

Figure 1:
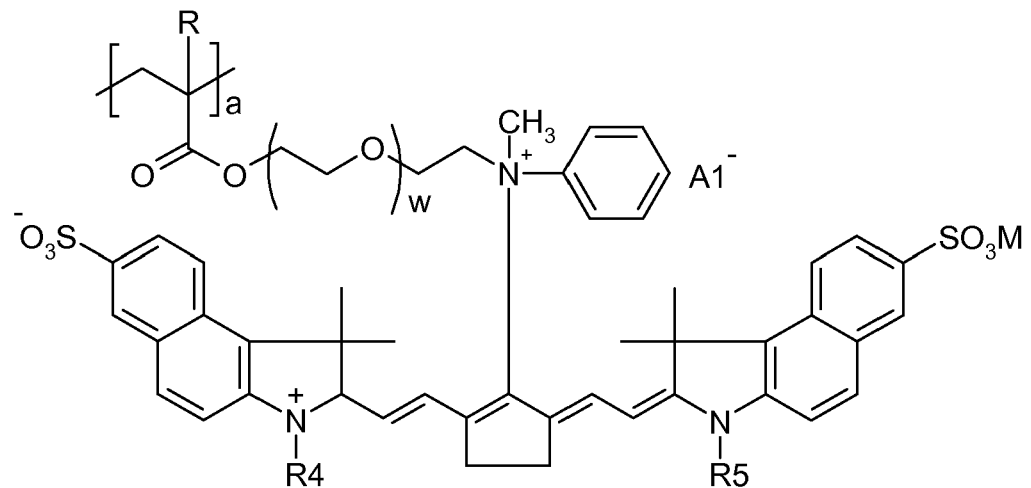
FIGS. 1 to 10 represent near infrared absorbing segments according to illustrative embodiments of the invention.
Figure 2:
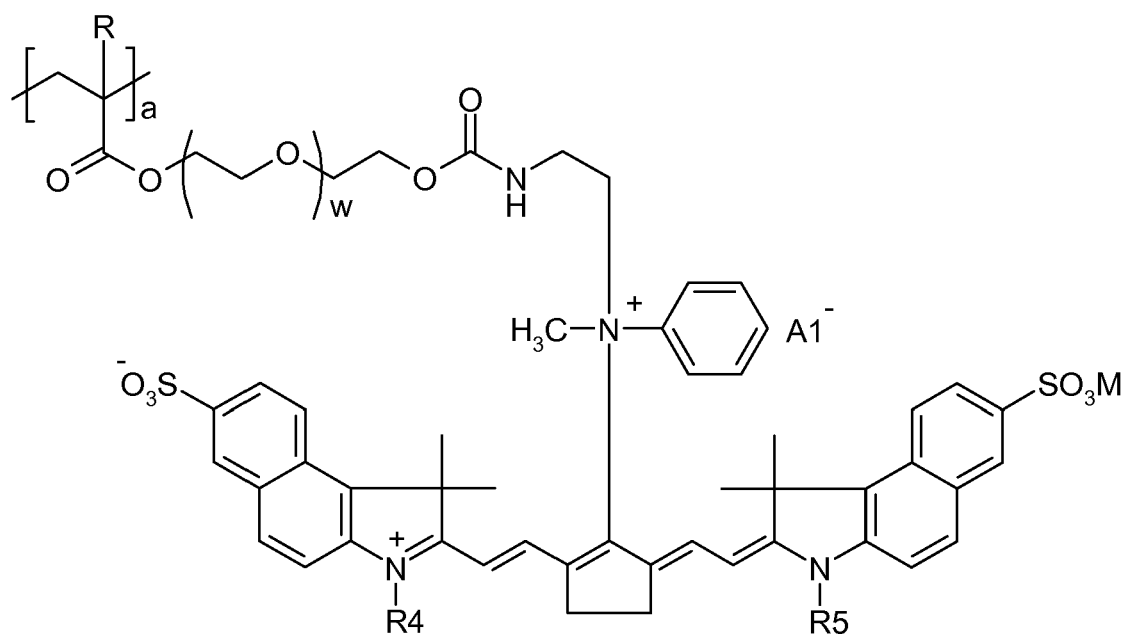
Figure 3:
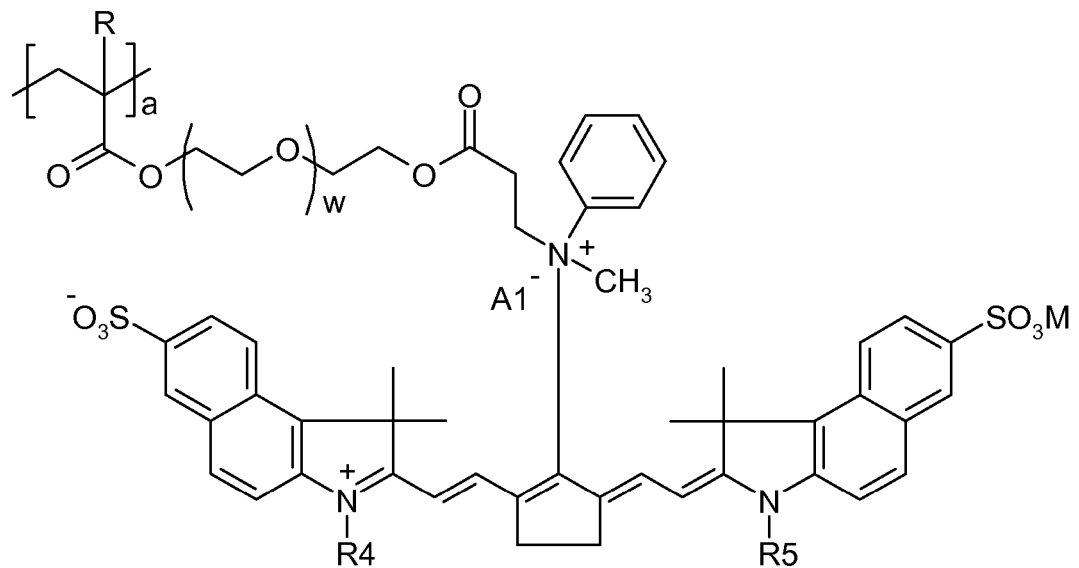
Figure 4:
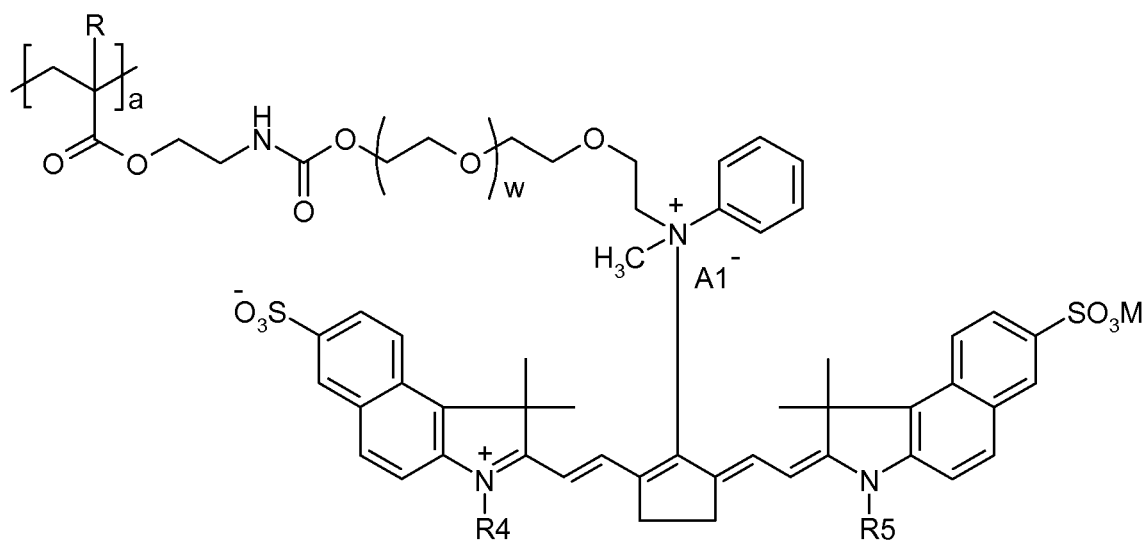
Figure 5:
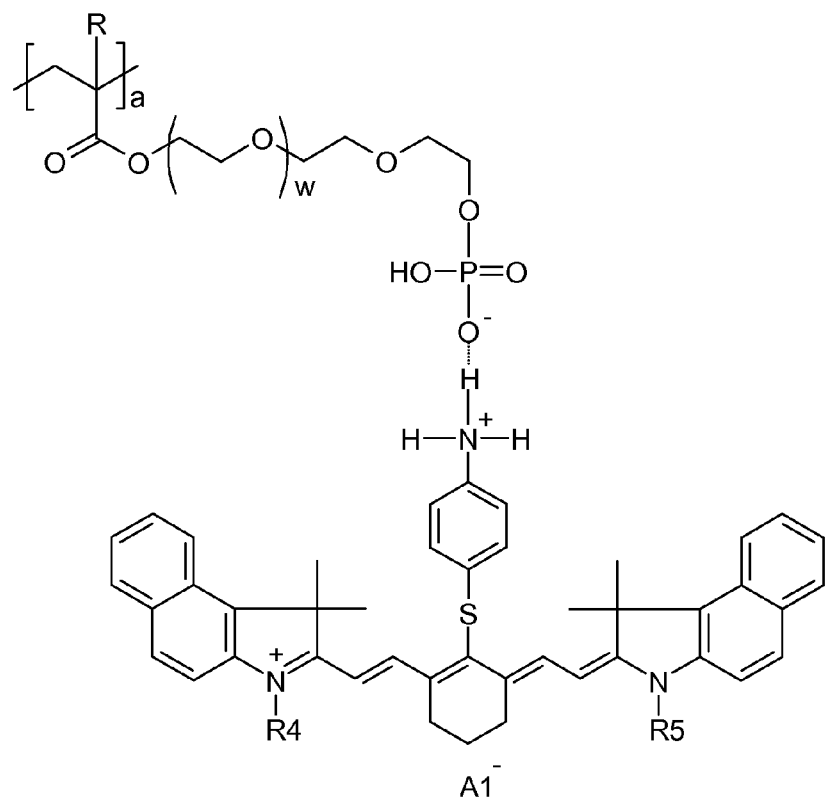
Figure 6:
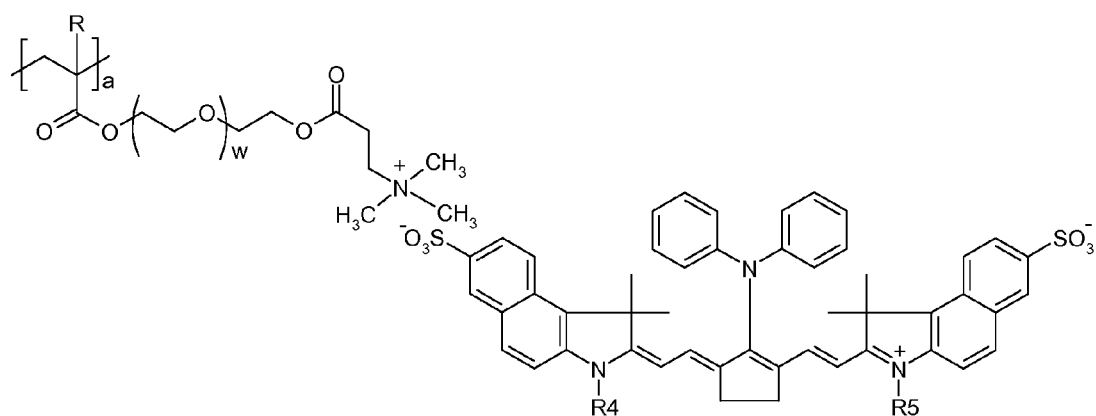
Figure 7:
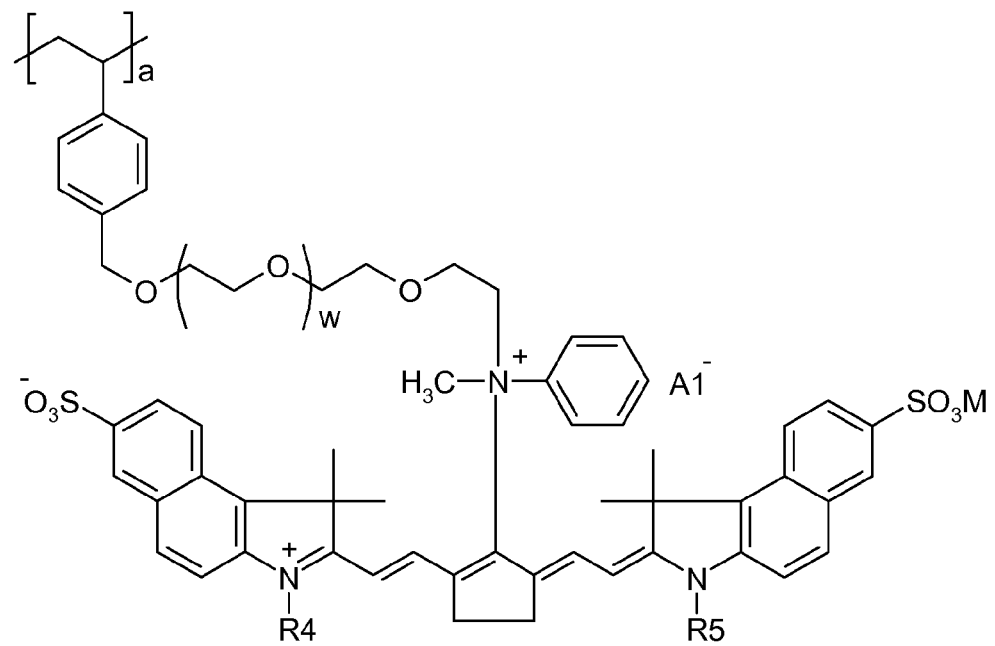
Figure 8:
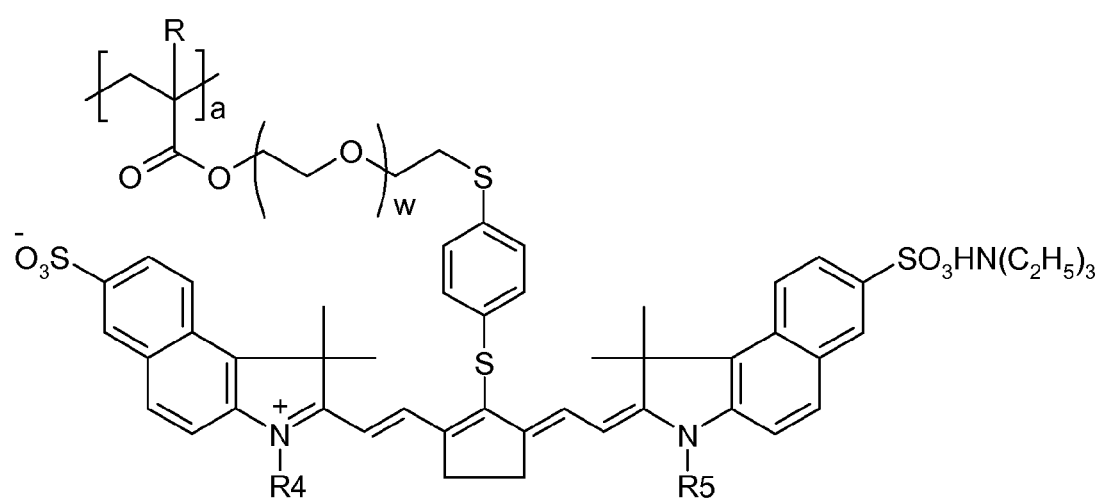
Figure 9:
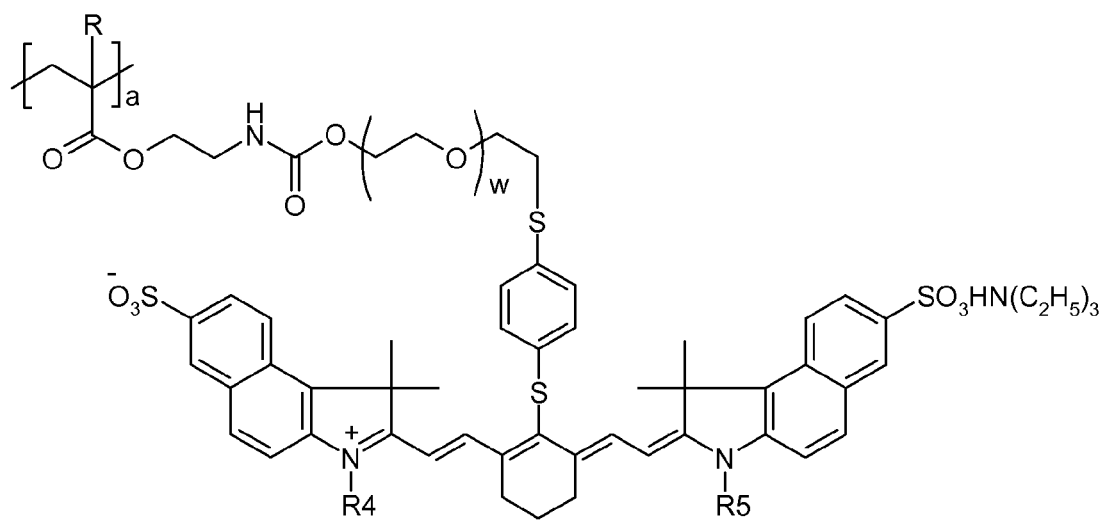
Figure 10:
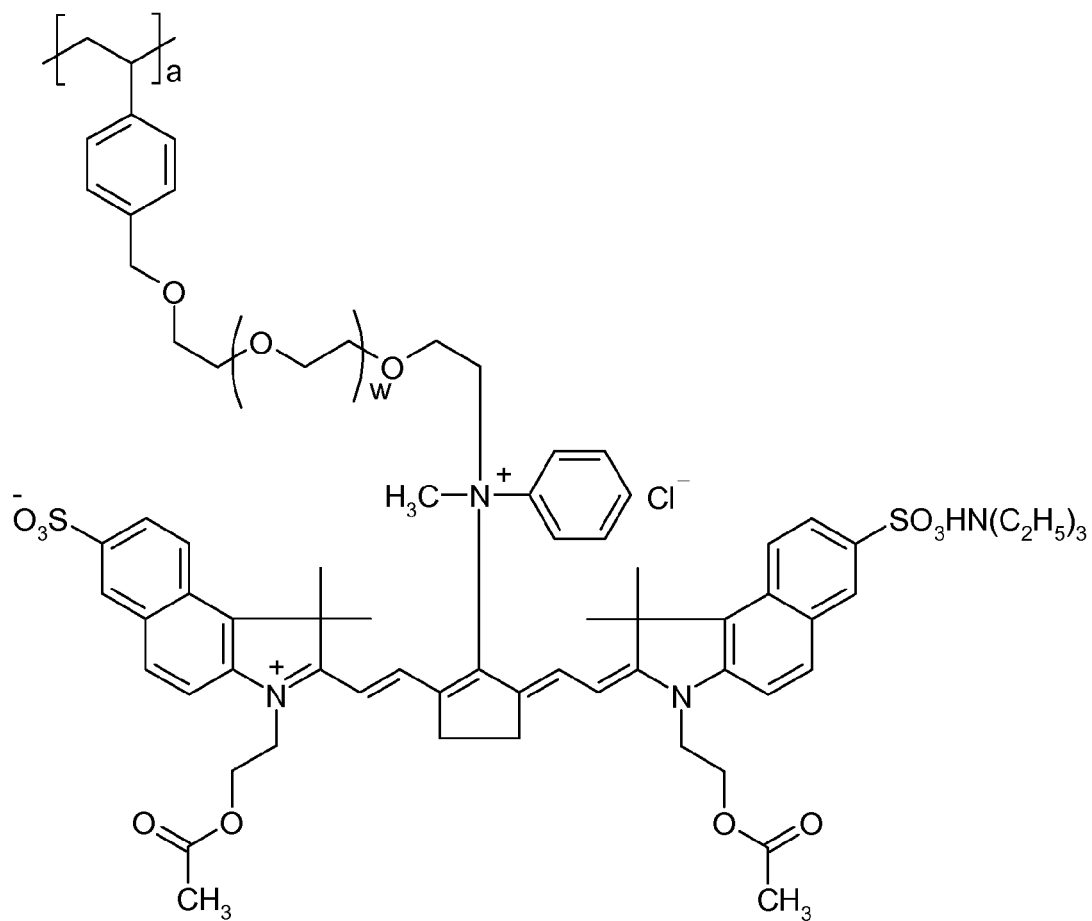
Figure 11:
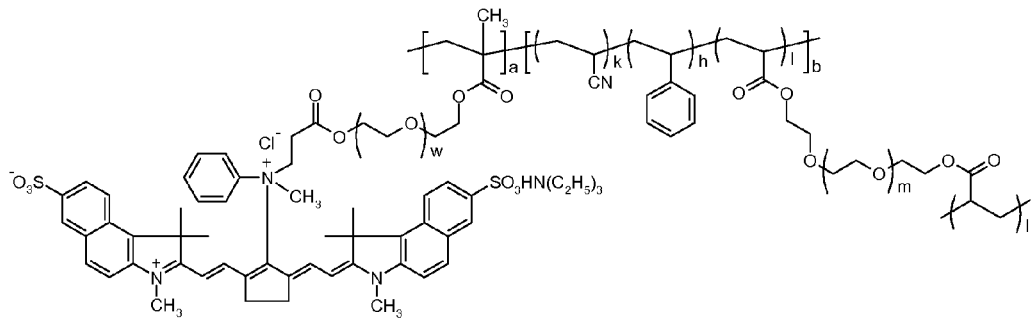
FIG. 11 to 13 represent cross-linked polymer according to illustrative embodiments of the invention.
Figure 12:
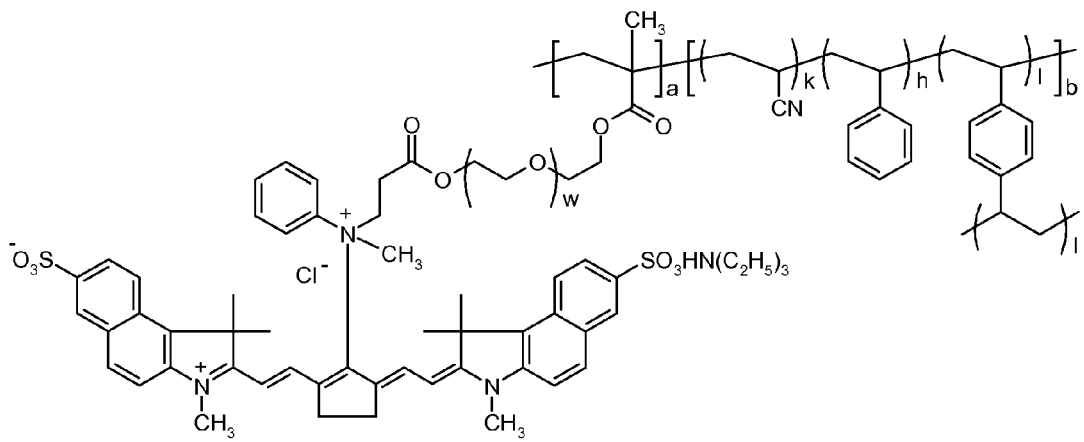
Figure 13:
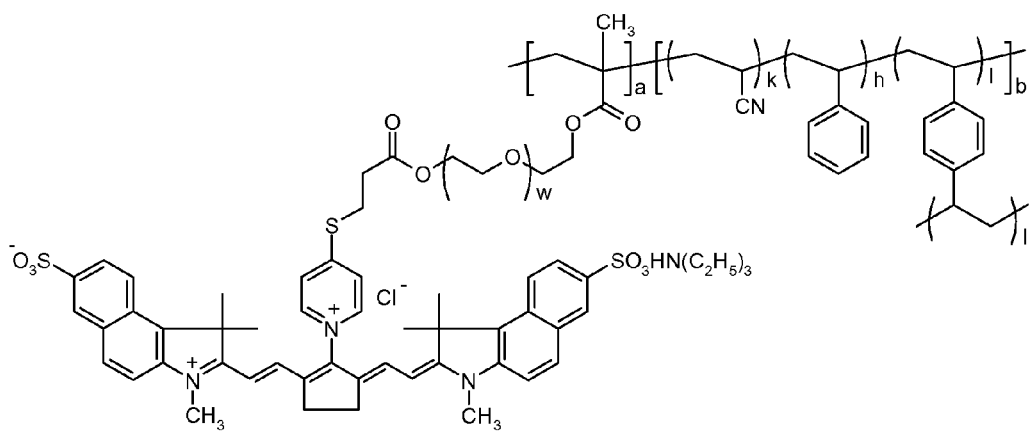
Figure 14:
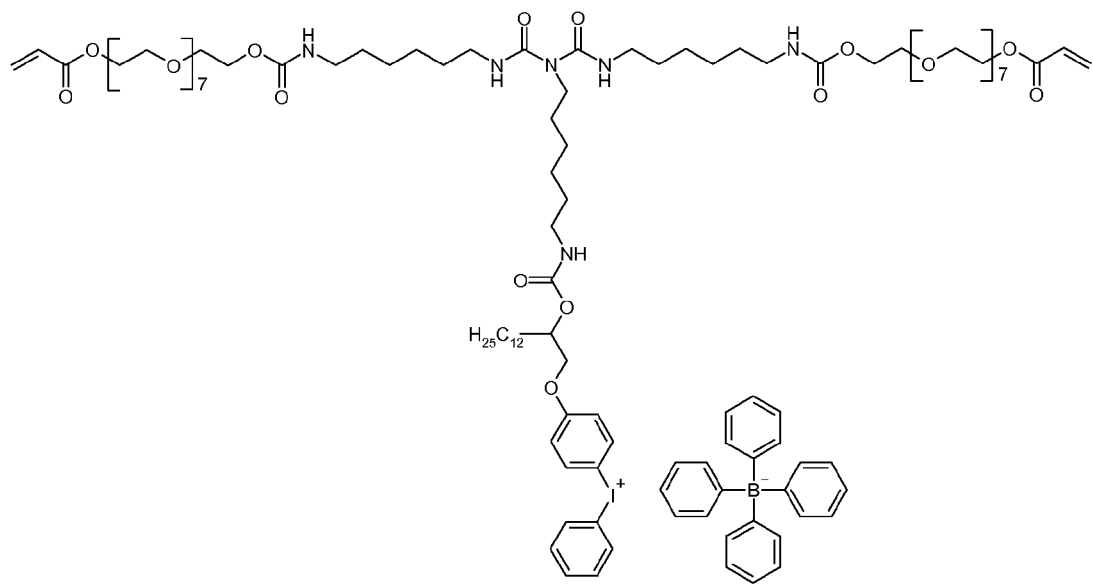
FIGS. 14 to 19 represent reactive iodonium oligomers that may be used with the polymeric particles according to illustrative embodiments of the invention.
Figure 15:
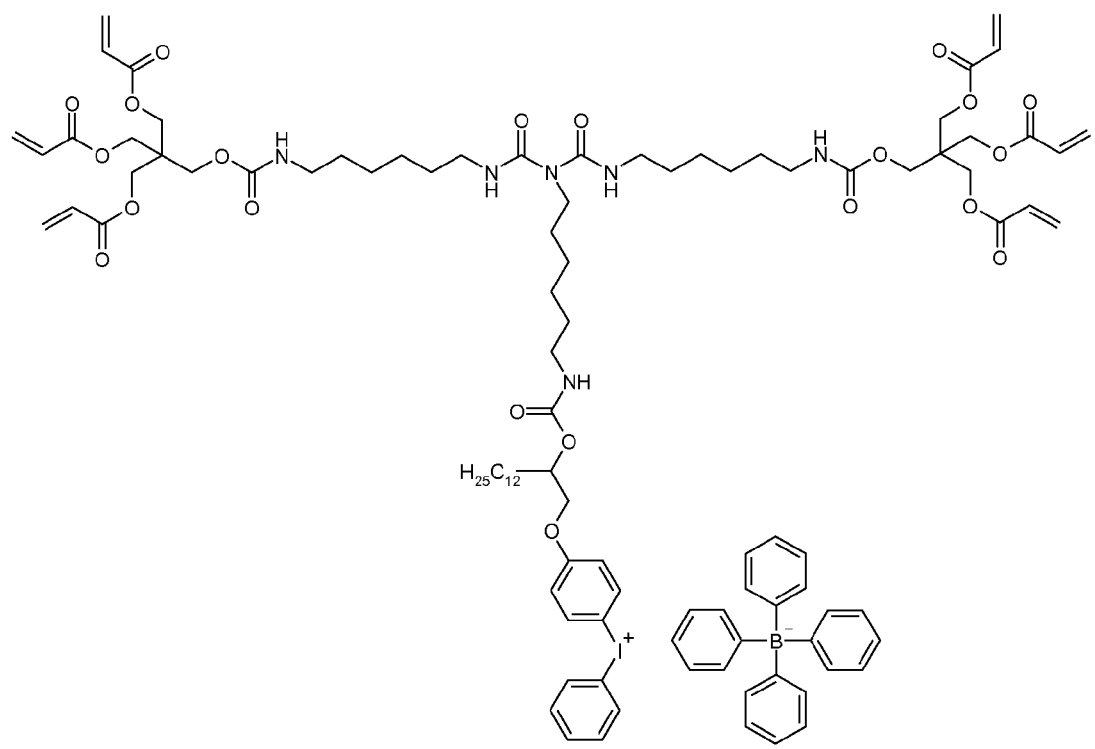
Figure 16:
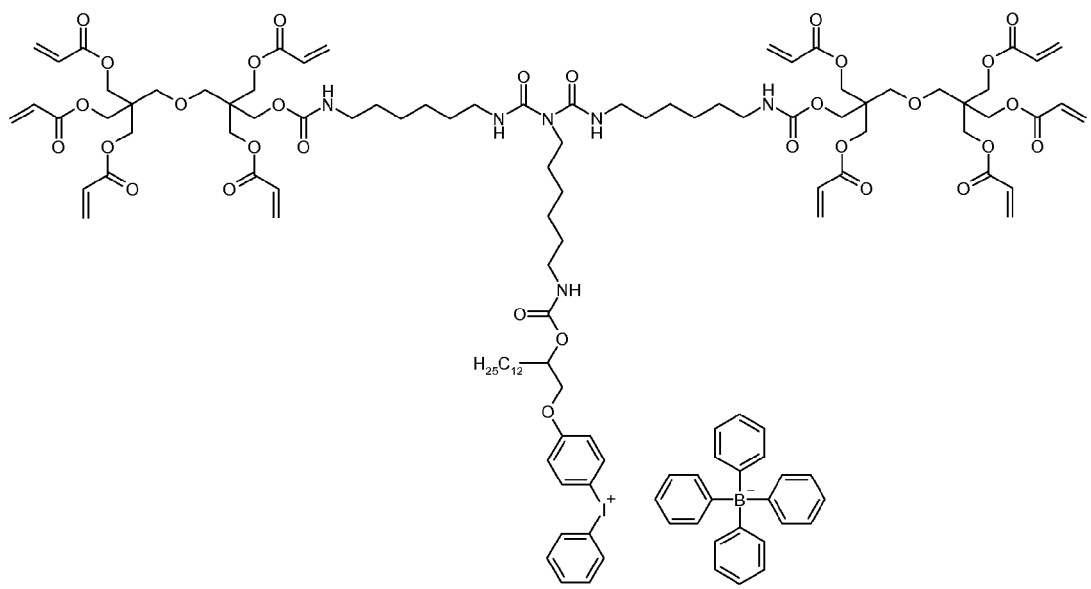
Figure 17:
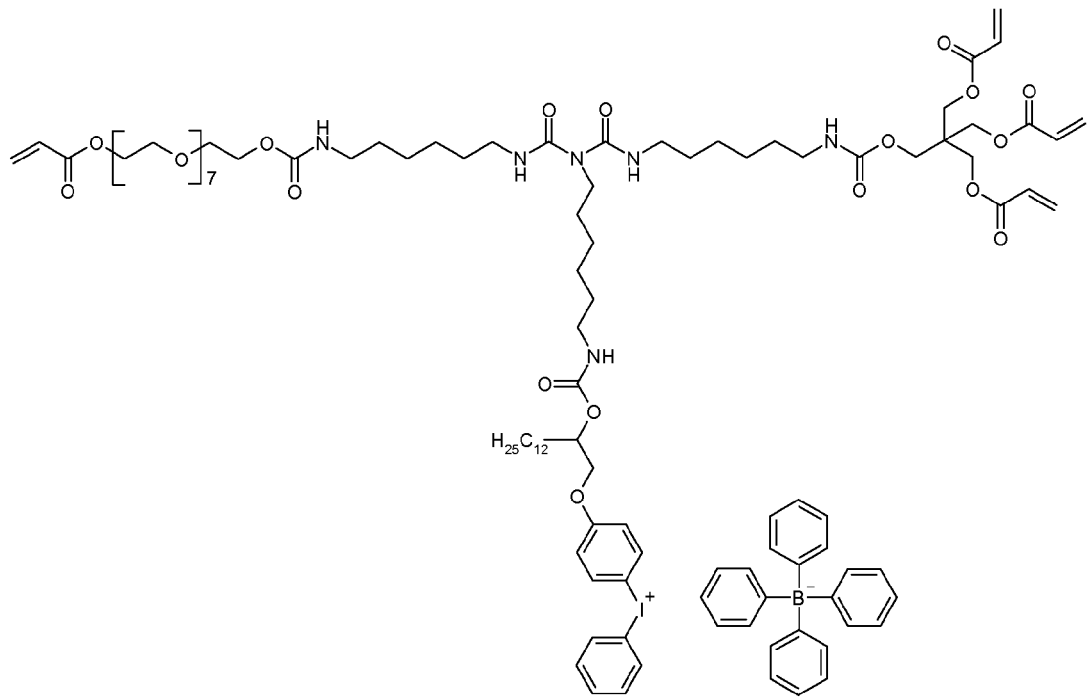
Figure 18:
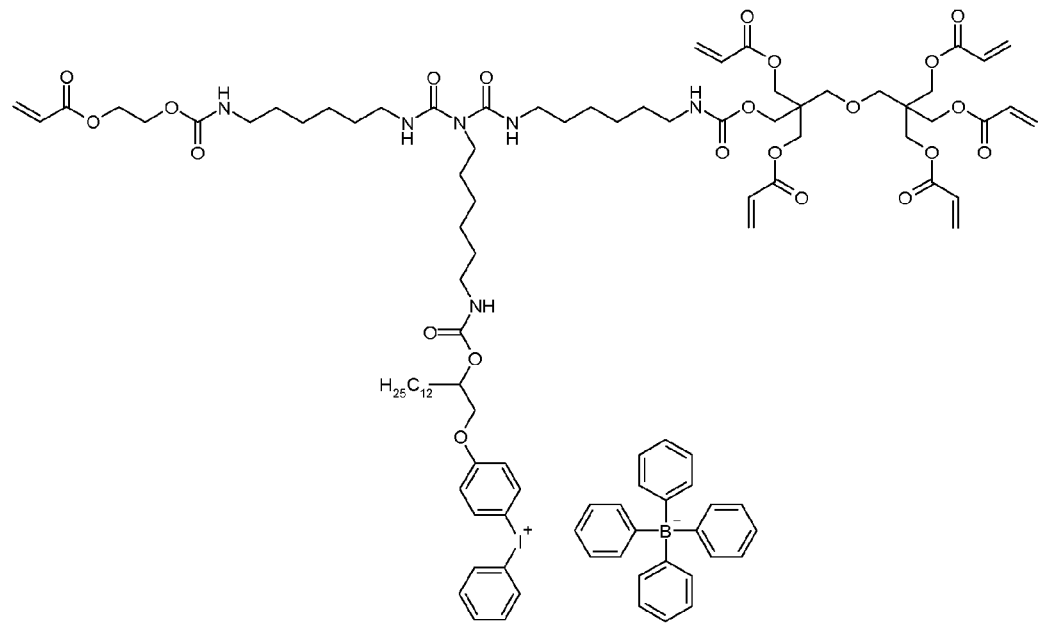
Figure 19:
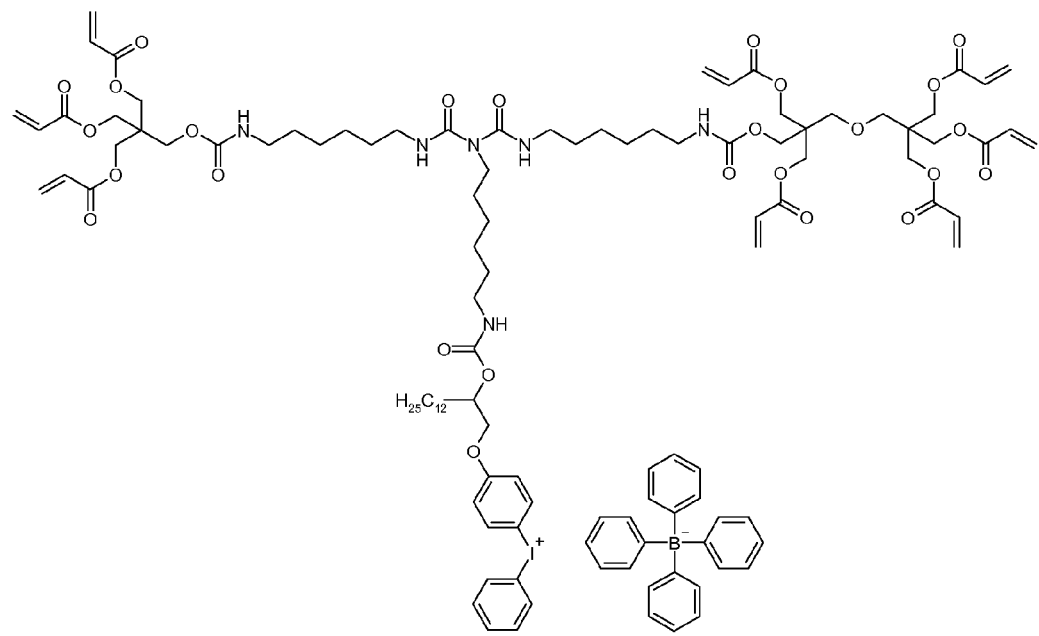
Figure 20:
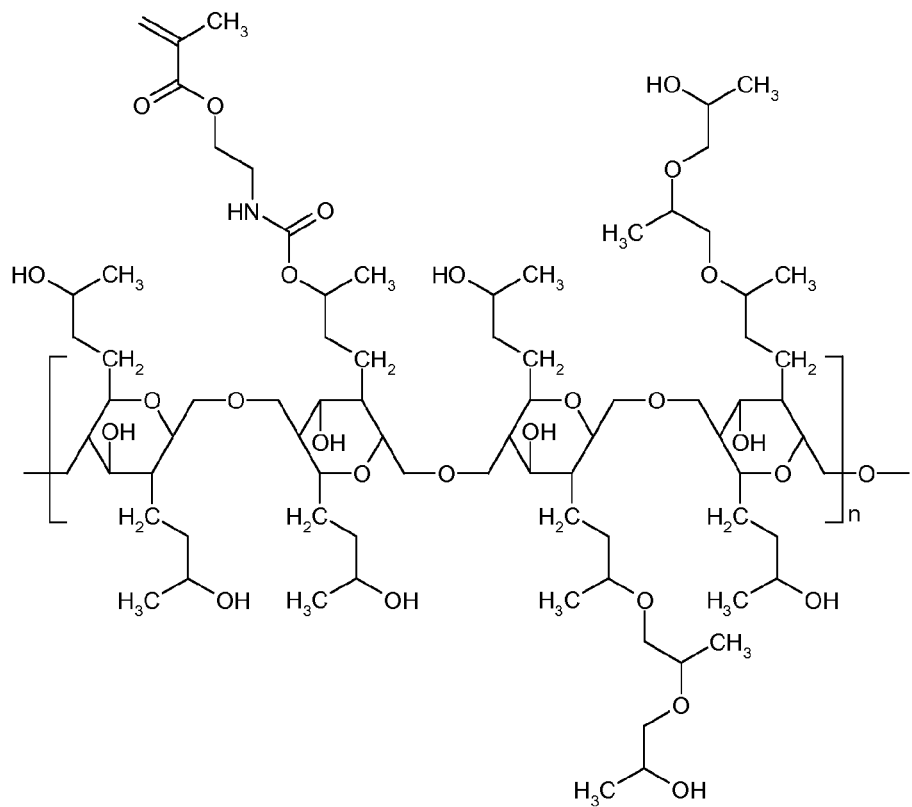
FIG. 20 is the idealized chemical structure of the cellulose polymer binder sold under the trade-name Tuxedo® XCP10.
Figure 21:
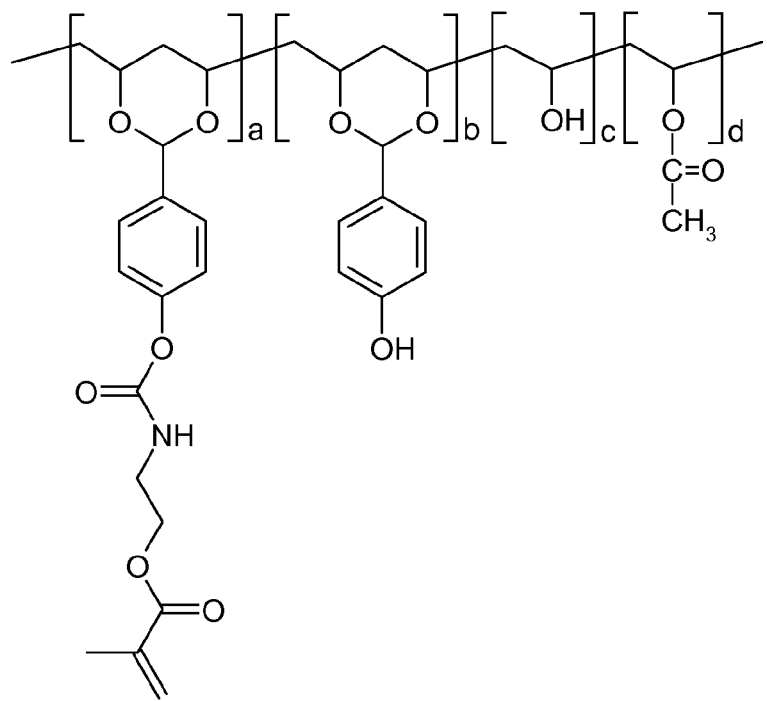
FIG. 21 is the idealized chemical structure of water soluble acetal copolymer binder sold under the trade-name Tuxedo® XAP02.
Figure 22:
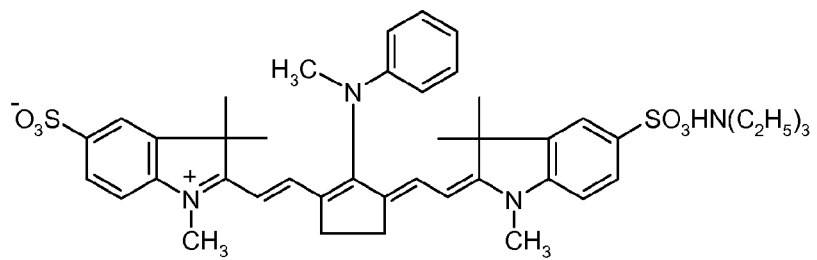
FIG. 22 represents near infrared absorbing chromophores that may be used for manufacturing the polymeric particles according to an illustrative embodiment of the invention.
Figure 22:
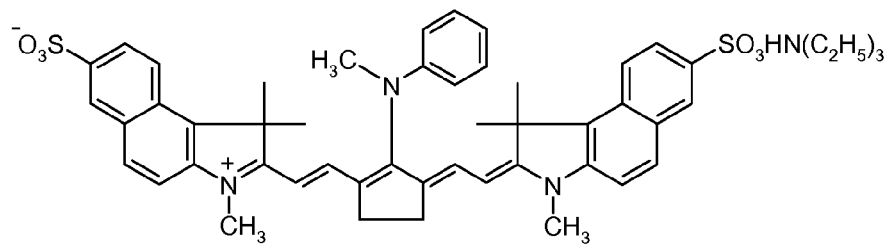
Figure 22:
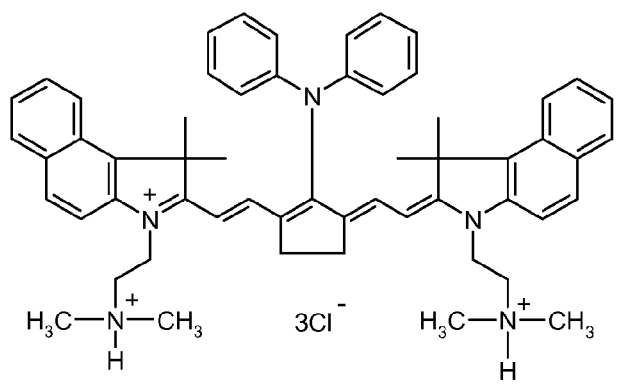
Figure 22:
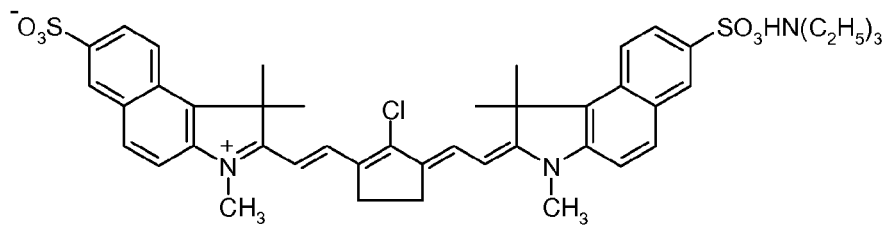
Figure 22:
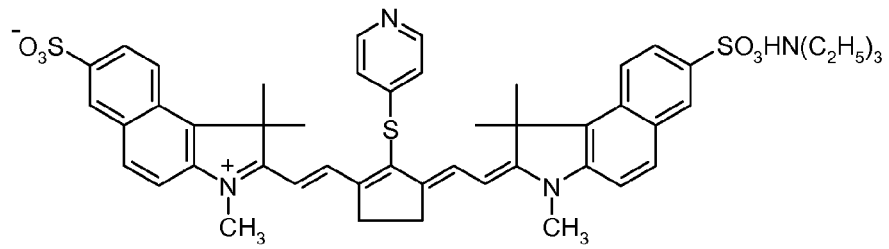
Figure 22:
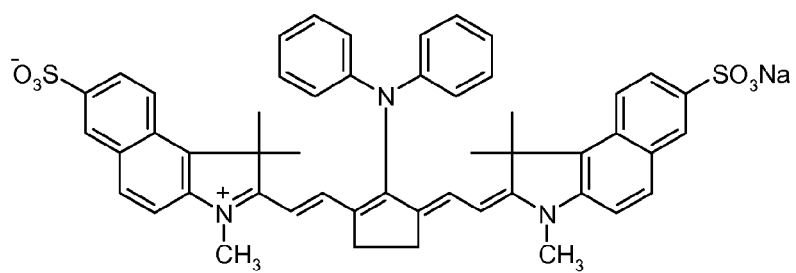

Near Infrared Absorbing Chromophores:

ADS796WS: Near infrared absorbing dye ($\lambda$max=796 nm in methanol solution) available from American Dye Source, Canada, which is represented by the structure of FIG. 22A.

ADS828WS: Near infrared absorbing dye ($\lambda_{max}$=828 nm in methanol solution) available from American Dye Source, Canada, which is represented by the structure of FIG. 22B.

ADS825TC: Near infrared absorbing dye ($\lambda_{max}$=825 nm in methanol solution) available from American Dye Source, Canada, which is represented by the structure of FIG. 22C.

ADS838WS: Near infrared absorbing dye ($\lambda_{max}$=838 nm in methanol solution) available from American Dye Source, Canada, which is represented by the structure of FIG. 22D.

ADS856WS: Near infrared absorbing dye ($\lambda_{max}$=856 nm in methanol solution) available from American Dye Source, Canada, which is represented by the structure of FIG. 22E.

ADS825NA: Near infrared absorbing dye ($\lambda_{max}$=825 nm in methanol solution) available from American Dye Source, Canada, which is represented by the structure of FIG. 22F.

Monomers:

AN: Acrylonitrile, available from Sigma-Aldrich Canada.

PEGDA700DA: Poly(ethylene glycol) diacrylate, average Mn~700, available from Sigma-Aldrich, Canada.

PEGMA2080ME: Poly(ethylene glycol) methyl ether methacrylate, as a 50% solution in water, average Mn~2080, available from Sigma-Aldrich, Canada.

Figure 23:
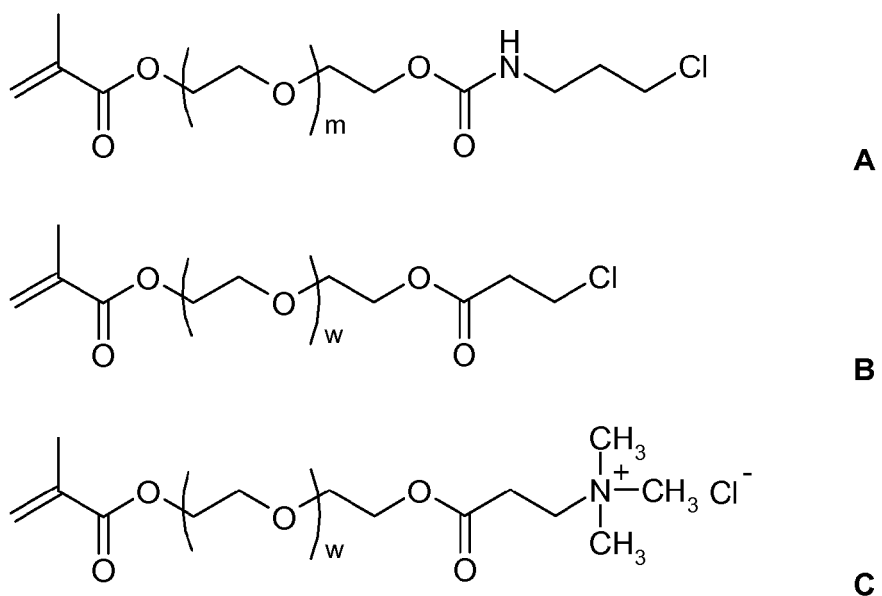
FIG. 23 represent poly(ethylene glycol)-based monomers that may be used for manufacturing the polymeric particles according to an illustrative embodiment of the invention.

PEGMA620CL: Poly(ethylene glycol) methacrylate chloride-terminated, average Mn~615, available from American Dye Source, Inc., Canada, represented by the structure of FIG. 23A, wherein m is around 14.

PEGMA1500CL: Poly(ethylene glycol) methacrylate chloride-terminated having average Mn~1,500, which is available from American Dye Source, Inc., Canada, represented by the structure of FIG. 23B, wherein w is around 30.

PEGMA1500N: Poly(ethylene glycol) methacrylate trimethyl ammonium chloride-terminated having average Mn~1,500, which is available from American Dye Source, Inc., Canada, represented by the structure of FIG. 23C, wherein w is around 30.

ST: Styrene, available from Sigma-Aldrich Canada.

VBC: 4-Vinylbenzyl chloride, available from Sigma-Aldrich, Canada.

VCBZ: 9-Vinylcarbazole, available from Sigma-Aldrich, Canada.

VPD: 4-vinylpyridine, available from Sigma-Aldrich, Canada.

Reactive Oligomers and Polymers:

Tuxedo® 06C051A: A mixture of reactive iodonium oligomers, which is available from American Dye Source, Inc. (Canada) under trade-name Tuxedo® 06C051A Photopolymer.

Tuxedo® XCP10: Hydroxypropyl cellulose having methacrylate functional group (1.0 mmole per gram), available from American Dye Source, Inc. (Canada) under trade-name Tuxedo® XCP10 photopolymer.

Tuxedo® XAP02: Water soluble acetal copolymer having methacrylate functional group (1.0 mmole per gram), available from American Dye Source, Inc. (Canada) under trade-name Tuxedo® XAP02 Photopolymer.

Initiators, Stabilizers and Colorants:

V64: 2,2'-Azobisisobutyronitrile free radical initiator available from DuPont (United States) under trade-name Vazo 64™.

Figure 24:
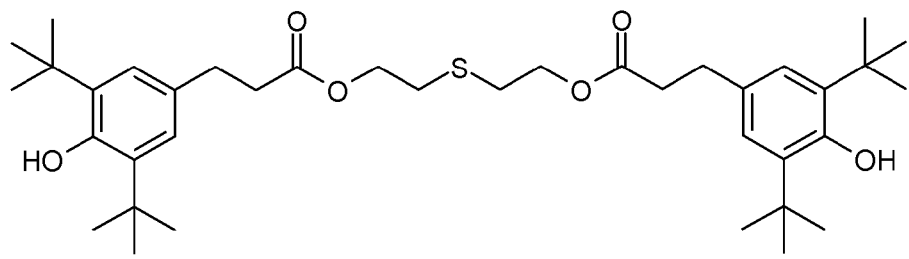
FIG. 24 represents the structure of the processing and thermal stabilizer sold under the trade-name Irganox 1035.

Irganox 1035: Processing and thermal stabilizer, available from Ciba Specialty Chemicals (Switzerland), which is represented by the structure of FIG. 24.

Mercapto triazole: Mercapto-3-triazole-1H,2,4 available from PCAS, France.

Blue-503: 3-(2-Ethoxy-4-diethylaminophenyl)-3-(1-ethyl-2-methylindol-3-yl)phthalide, available from Yamamoto Chemicals, Inc., Japan.

Synthesis and Characterization of Near Infrared Absorbing Polymeric Particles:

These syntheses were performed in a 4 necks glass reactor equipped with a water condenser, a mechanical stirrer, a dropping funnel and a nitrogen or air gas inlet. The molecular structures of the obtained materials were determined by FTIR spectroscopy (Perkin-Elmer, Model Spectrum 100). The average molecular weight of the copolymers obtained was determined by size exclusion chromatography (Waters, Model Breeze), using N,N-dimethylformamide (DMF) solution and calibrated with polystyrene standards. The UV-Visible near-infrared spectra of the synthesized polymers were measured in methanol solutions or on the solid films using a UV-VIS spectrophotometer (Perkin-Elmer, Model Lambda 35). The particle sizes were measured using an Utrafine Particle Analyzer (Microtrac, Model UPA 150).

Example 1

Near infrared absorbing polymeric particles NIRP01 were synthesized by heating a reaction mixture containing 200 grams of isopropanol, 50 grams of de-ionized water, 18.0 grams of PEGMA1500CL, 40.0 grams of AN, and 14.0 grams of ST in a 1 L 4-neck flask at 75° C. under nitrogen atmosphere and constant stirring. After heating for 30 minutes, 0.5 g of V64 was added into the reaction mixture. The solution mixture became hazy within 30 minutes of polymerization, which was indicative of the formation of polymeric particles. Ten hours later, 0.5 grams of V64 was added into the reaction mixture and the polymerization was continued for another 14 hours at 75° C. Air was introduced into the reaction mixture, which was stirred at 75° C. for another 2 hours to terminate the polymerization. A stable milky-white solution of polymeric particles was obtained. The particles had an average molecular weight around 65,000 Dalton. Then 10.5 grams of ADS828WS were added to the reaction mixture, which was stirred at 75° C. for 5 hours and produced a dark green viscous solution of near infrared absorbing polymeric particles. The solid weight content of the solution was adjusted to 20% (by weight) using isopropanol.

Figure 25:
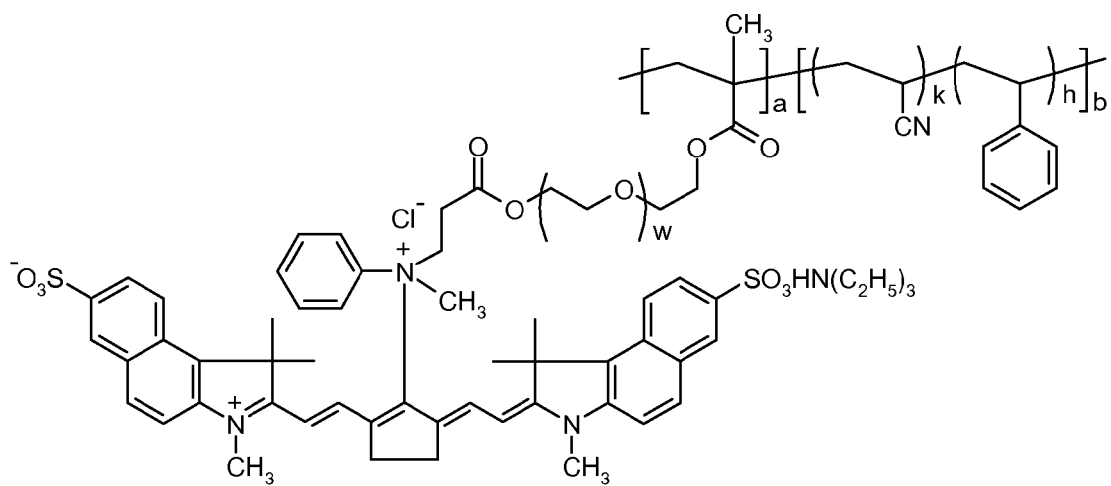
FIGS. 25 to 35 represent the NIRP01, NIRP02, NIRP03, NIRP04, NIRP05, NIRP06, NIRP07, NIRP08, NIRP09, NIRP10, and NIRP11 polymers according to illustrative embodiments of the invention, respectively.

A diluted solution of NIRP01 in methanol showed a strong absorption band having a maximum peak at around 825 nm, which indicated that the near infrared chromophore was grafted onto the surface of the polymeric particles. The average diameter of the obtained near infrared absorbing polymeric particles NIRP01 was determined to be around 280 nm and the idealized chemical structure is shown in FIG. 25, where a=0.0133, b=0.987, k=0.849, h=0.151 and w=30.

Examples 2-11

The near infrared absorbing polymeric particles of Examples 2-10 have been synthesized as described in Example 1. The compounds prepared in these examples are shown in FIGS. 26-35 and are listed in Table 1, along with their characteristics and the compounds used for their preparation. For greater clarity, the compound of Example 1 is also listed in this table.

In all examples, the time for the reaction mixture to become hazy was between about 30 and about 90 minutes.

Examples 1 to 7 are concerned with near infrared absorbing polymeric particles without crosslinked polymer backbones, while Examples 8 to 10 are concerned with near infrared absorbing polymeric particles with crosslinked polymer backbones.

Figure 32:
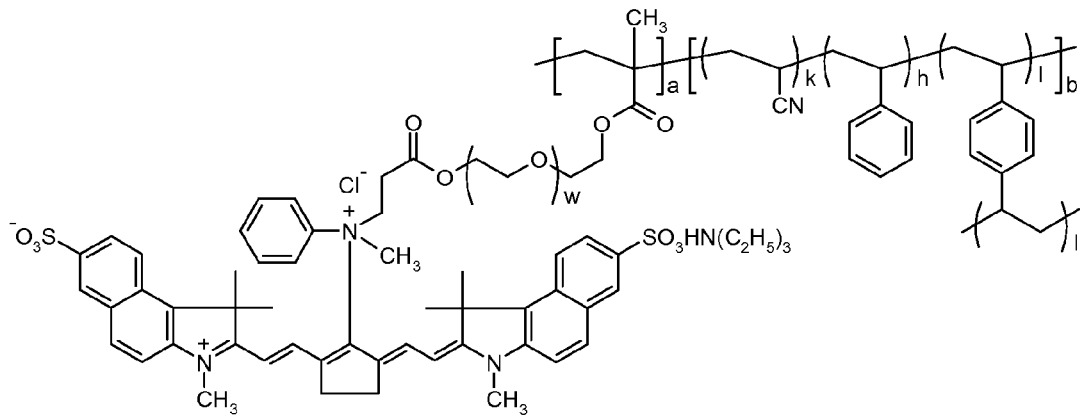
Figure 33:
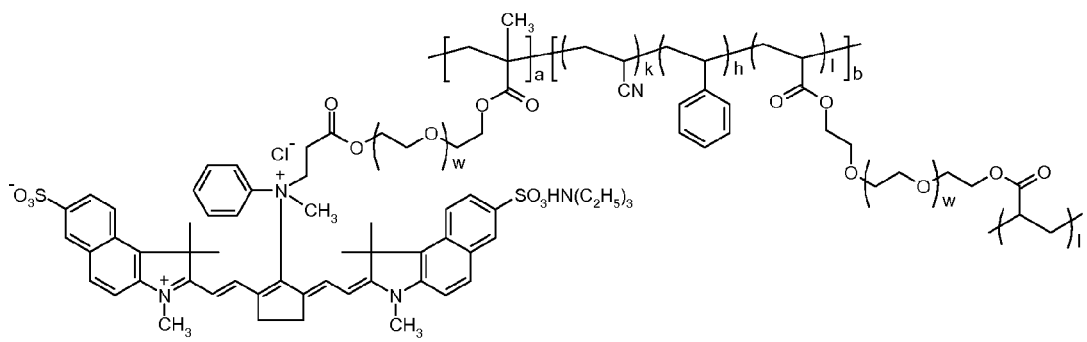

In the particles of Examples 8 and 9, which are illustrated in FIGS. 32 and 33, the crosslink is located between the two monomeric units having their number of repeating unit equal to "l". The other monomeric units of the second polymer, which is crosslinked to the one illustrated, are not shown.

Figure 34:
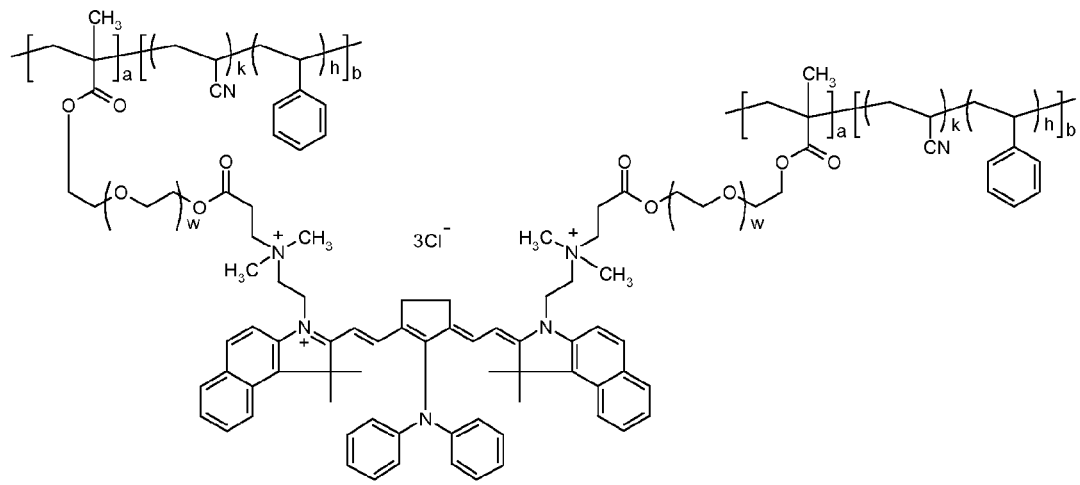

In Example 10, the near infrared absorbing polymeric particles have their polymer backbones crosslinked via a near infrared absorbing chromophore, as can be seen in FIG. 34.

TABLE 1

Examples 1-10

Figure 26:
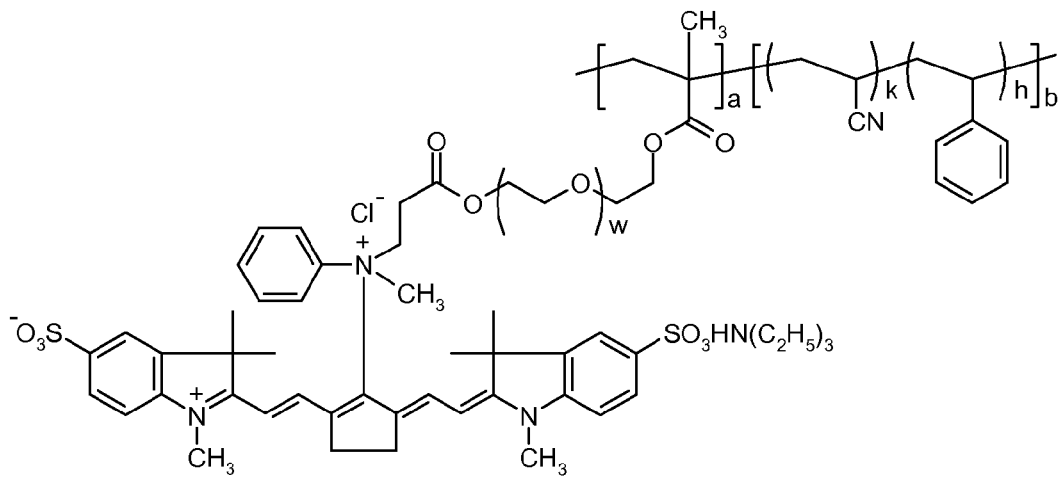
Figure 27:
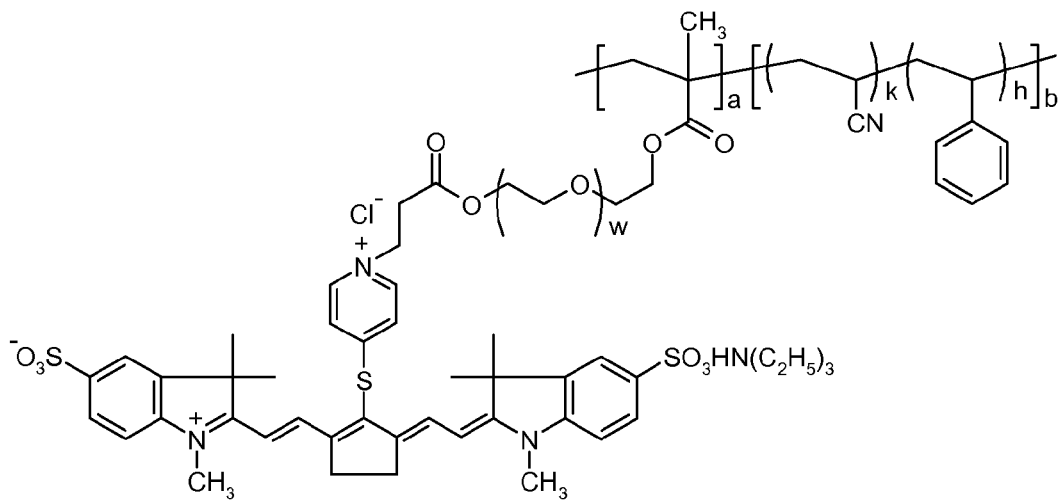
Figure 28:
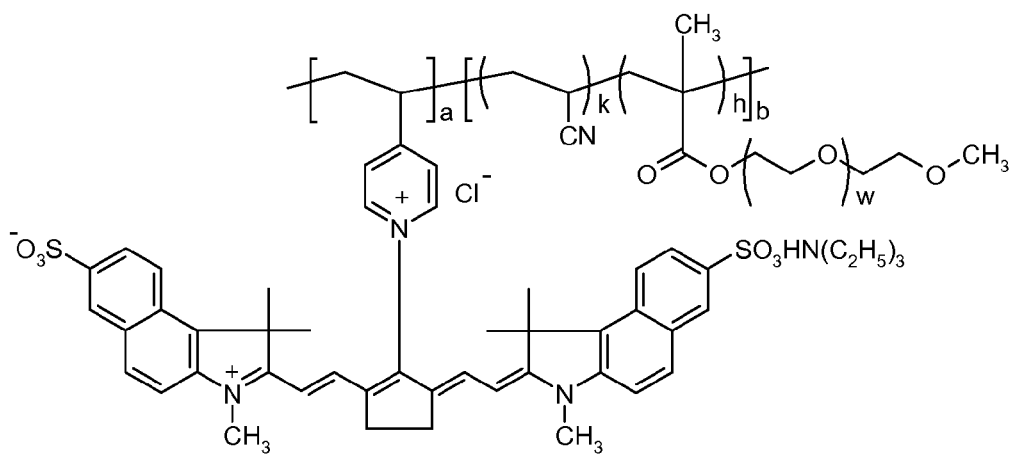
Figure 29:
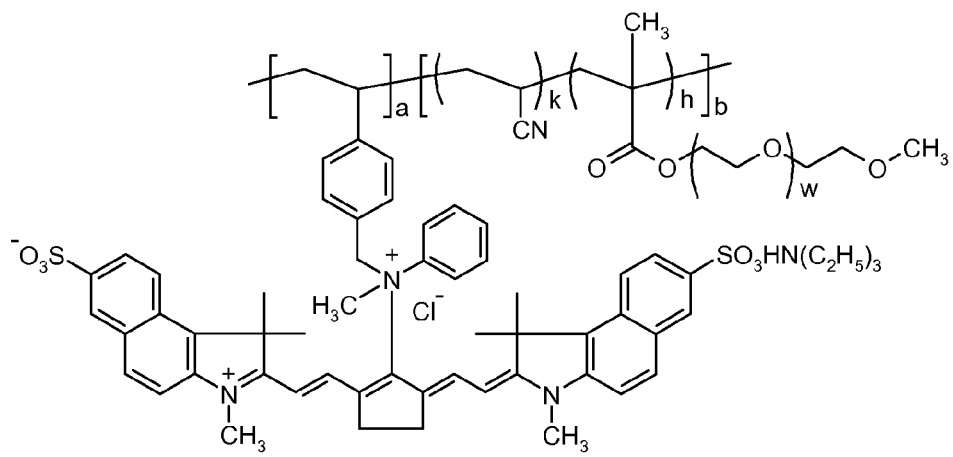
Figure 30:
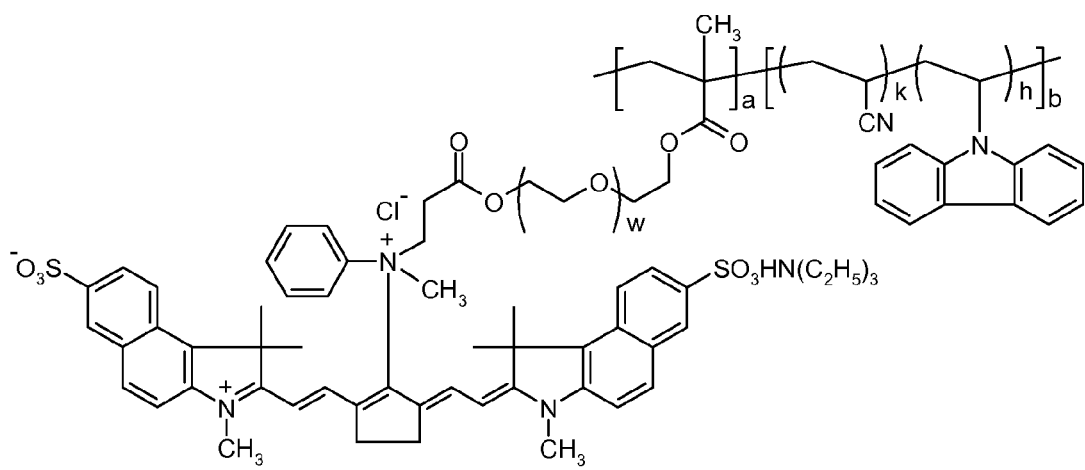
Figure 31:
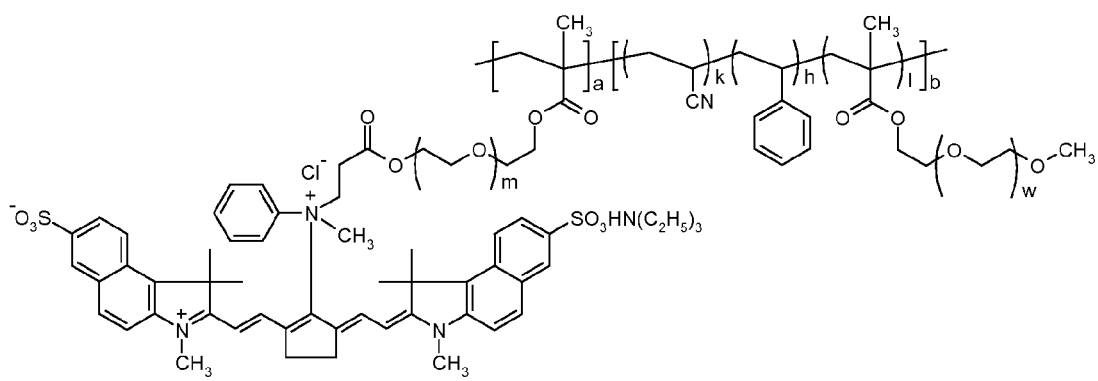
Figure 35:
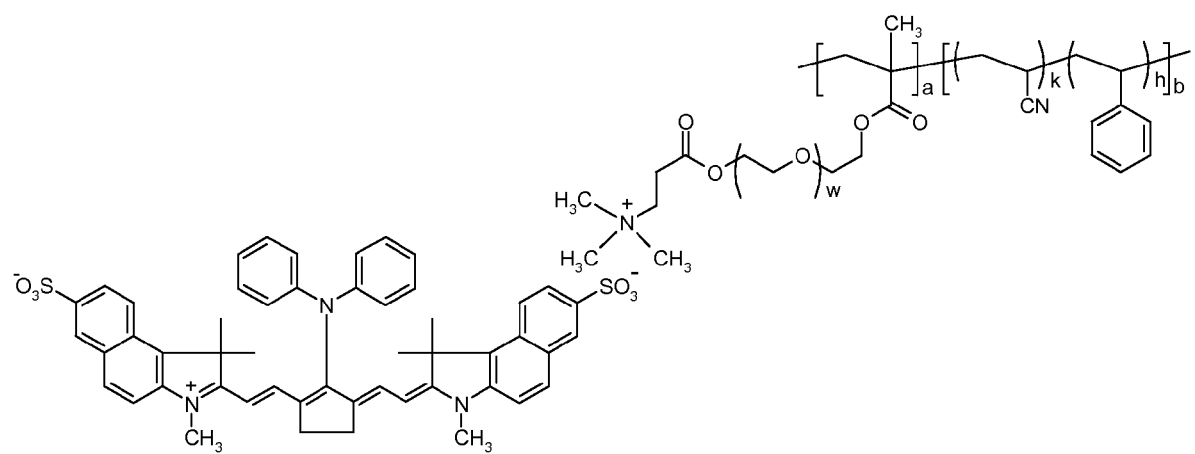

| Ex. | Compound | Composition of the starting mix* | Chromophore | Molecular weight (Dalton) | Maximum absorption peak (nm) | Average Diameter of particles (nm) | Figure |
|---|---|---|---|---|---|---|---|
| 1 | NIRP01 | 18.0 g PEGMA1500CL 40.0 g AN 14.0 g ST | 10.5 g ADS828WS | 65,000 | 825 | 280 | FIG. 25 $a = 0.0133; b = 0.987;$ $k = 0.849; h = 0.151; w = 30$ |
| 2 | NIRP02 | 18.0 g PEGMA1500CL 40.0 g AN 14.0 g ST | 9.2 g ADS796WS | 65,000 | 802 | 280 | FIG. 26 $a = 0.0133; b = 0.987; k = 0.849;$ $h = 0.151; w = 30$ |
| 3 | NIRP03 | 18.0 g PEGMA1500CL 40.0 g AN 14.0 g ST | 9.3 g ADS817WS | 65,000 | 817 | 280 | FIG. 27 $a = 0.0133; b = 0.987; k = 0.849;$ $h = 0.151; w = 30$ |
| 4 | NIRP04 | 28.0 g PEGMA2080ME 45.0 g AN 16.0 g 4-VPD | 12.2 g ADS838WS | 26,000 | 830 | 210 | FIG. 28 $a = 0.142; b = 0.858; k = 0.992;$ $h = 0.008; w = 50$ |
| 5 | NIRP05 | 28.0 g PEGMA2080ME 40.0 g AN 18.0 g 4-VBC | 10.0 g ADS828WS | 75,000 | 825 | 300 | FIG. 29 $a = 0.123; b = 0.877; k = 0.918;$ $h = 0.082; w = 50$ |
| 6 | NIRP06 | 18.0 g PEGMA1500CL 40.0 g AN 14.0 g VCBZ | 10.5 g ADS828WS | 65,000 | 825 | 300 | FIG. 30 $a = 0.0143; b = 0.9857; k = 0.913;$ $h = 0.087; w = 30$ |
| 7 | NIRP07 | 7.5 g PEGMA620CL 10.0 g PEGMA2080ME 40.0 g AN 14.0 grams ST | 10.5 g ADS828WS | 57,000 | 825 | 260 | FIG. 31 $a = 0.0134; b = 0.9866; k = 0.844;$ $h = 0.150; l = 0.006; m = 14;$ $w = 50;$ |
| 8 | NIRP08 | 18.0 g PEGMA1500CL 40.0 g AN 13.9 g ST 0.130 g DVB | 10.5 g ADS828WS | 105,000 | 825 | 340 | FIG. 32 $a = 0.0133; b = 0.987; k = 0.849;$ $h = 0.141; l = 0.010; w = 30$ |
| 9 | NIRP09 | 18.0 g PEGMA1500CL; 40.0 g AN 13.9 g ST 0.7 g PEGDA700 | 10.5 g ADS828WS | 97,000 | 825 | 320 | FIG. 33 $a = 0.0133; b = 0.987; k = 0.849;$ $h = 0.141; l = 0.010; w = 30$ |
| 10 | NIRP10 | 24.0 g PEGMA1500CL 40.0 g AN 14.0 g ST | 14.5 g ADS825TC | 83,000 | 825 | 350 | FIG. 34 $a = 0.0177; b = 0.9823; k = 0.849;$ $h = 0.151; w = 30$ |
| 11 | NIRP11 | 18.0 g PEGMA1500N 40.0 g AN 14.0 g ST | 10.5 g ADS825NA | 65,000 | 825 | 280 | FIG. 35 $a = 0.0133; b = 0.987; k = 0.849;$ $h = 0.151; w = 30$ |

*The starting mix also included 200 grams of isopropanol and 50 grams of de-ionized water.

On-Press Developable Negative-Working Lithographic Printing Plates

In the following examples, the coating mixtures were coated on Al substrates substrate using wire-wound rod and dried at 80° C. with hot air. The obtained coatings typically weighted around 0.9 g/m$^2$.

The coated plates were imaged on Creo Trendsetter 3244 using the energy densities specified within the examples. In all cases, the laser exposed area showed a visible brownish printout.

All the imaged plates were mounted on the Komori Sheet-Fed Press, Model Sprint S26 using HyPlus-H-Series black ink (available from Toyo Ink, Japan) and MyLan-UF200 fountain solution (available from MyLan Chemicals, Vietnam). High quality printing image was typically obtained on paper after about 30 impressions and all the plates could produce more than 10,000 high-resolution copies.

Example 12

A coating composition for on-press developable negative-working lithographic printing plates was prepared by mixing the ingredients listed in Table 2. The obtained coating mixture typically contained about 7.0 wt % of total solids in isopropanol.

TABLE 2

Coating composition

| Composition | Parts in grams |
|---|---|
| NIRP01 as prepared in Example 1 | 15.0 |
| Tuxedo ® 06C051A | 6.82 |
| Tuxedo ® XCP10 | 6.00 |
| 3-Mercapto triazole | 0.30 |
| Blue-503 | 0.30 |
| BYK336 | 0.20 |

The coated plate was imaged at an energy density of 150 mJ/cm$^2$.

Example 13

The coating solution was prepared similarly to Example 12 with the exception that NIRP08 was used to replace NIRP01. The coated plate was imaged at an energy density of 100 mJ/cm$^2$.

Example 14-22

The coating solutions were prepared similarly to Example 12, with the exception that NIRP01 was replaced with other near infrared absorbing polymeric particles as shown in Table 3. The coated plates were imaged at energy densities between 80 and 200 mJ/cm$^2$ by increment of 20 mJ/cm$^2$. The energy densities listed in Table 3 are that required for obtaining a plate capable of producing 10,000 copies.

TABLE 3

Examples 14-22

| Examples | Replacing NIRP01 with | Energy density (mJ/cm$^2$) |
|---|---|---|
| 14 | NIRP02 | 150 |
| 15 | NIRP03 | 150 |
| 16 | NIRP04 | 140 |
| 17 | NIRP05 | 120 |

TABLE 3-continued

Examples 14-22

| Examples | Replacing NIRP01 with | Energy density (mJ/cm$^2$) |
|---|---|---|
| 18 | NIRP06 | 120 |
| 19 | NIRP07 | 120 |
| 20 | NIRP09 | 110 |
| 21 | NIRP10 | 120 |
| 22 | NIRP11 | 120 |

Example 23

A coating composition for on-press developable negative-working lithographic printing plates was prepared by mixing the ingredients listed in Table 4. The obtained coating mixture typically contained about 7.0 wt % of total solids in isopropanol.

TABLE 4

Coating composition

| Composition | Parts in grams |
|---|---|
| NIRP08 as prepared in Example 8 | 15.0 |
| Tuxedo ® 06C051A | 6.82 |
| Tuxedo ® XAP02 | 6.00 |
| 3-Mercapto triazole | 0.30 |
| Blue-503 | 0.30 |
| BYK336 | 0.20 |

The coated plate was imaged at an energy density of 150 mJ/cm$^2$.

Although the present invention has been described hereinabove by way of specific embodiments thereof, it can be modified, without departing from the spirit and nature of the subject invention as defined in the appended claims.

What is claimed is:

1. A polymeric particle having a particle size between about 60 nm and about 1000 nm and comprising a polymer, said polymer comprising:
    (a) a hydrophobic backbone,
    (b) a near infrared absorbing segment having attached thereto a near infrared absorbing chromophore having an absorption peak between about 700 nm and about 1100 nm; and
    (c) a near infrared transparent segment,
wherein the polymeric particle coalesces with neighbouring polymeric particles upon exposure to a radiation having a wavelength between about 700 nm and about 1100 nm.

2. The polymeric particle of claim 1 wherein said polymer has the following structure:

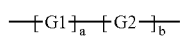

wherein:
    G1 represents said absorbing segment;
    G2 represents said transparent segment;
    G1 and G2 form said hydrophobic backbone;
    a and b independently represent molar ratios between 0.01 and 0.99; and said chromophore is covalently or electrostatically attached to said hydrophobic backbone as a pendant group.

3. The polymeric particle of claim 2 wherein said absorbing segment comprises:

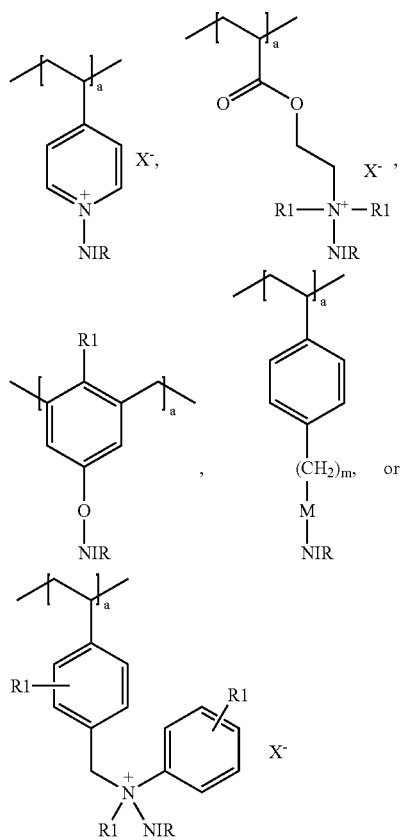

wherein:
NIR represents said chromophore;
R1 represents hydrogen or $C_1$-$C_{18}$ alkyl;
X represents a bromide, chloride, iodide, tosylate, triflate, trifluoromethane carbonate, dodecyl benzosulfonate, tetraphenylborate, alkyl-triphenylborate, tetrafluoroborate or hexafluoroantimonate anionic counter ion;
M represents oxygen, sulfur, or dialkylamino;
a represents a molar ratio between 0.01 and 0.99; and
m represents a number repeating units between 1 and 5.

4. The polymeric particle of claim 2 wherein said absorbing segment comprises a polyether linker covalently attaching said chromophore to said polymer backbone.

5. The polymeric particle of claim 4 wherein said absorbing segment comprises:

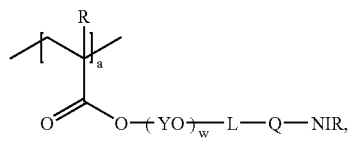

-continued

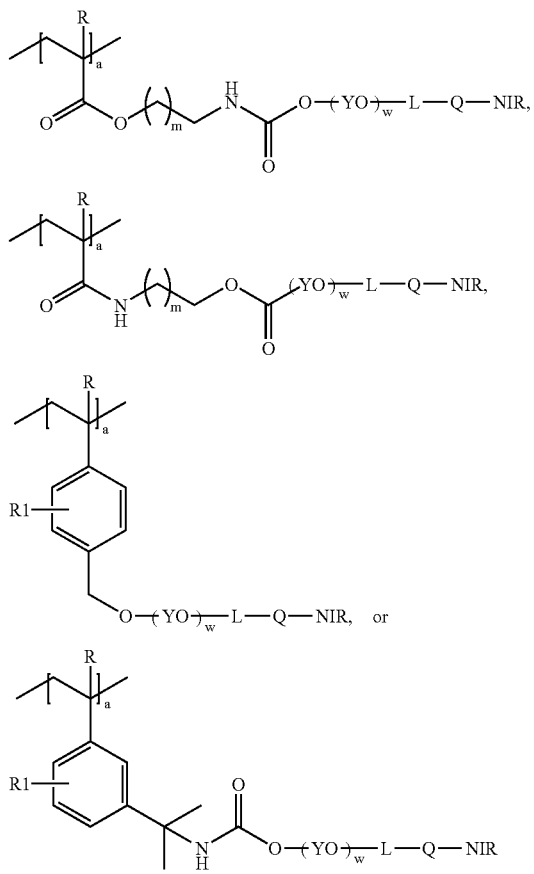

wherein:
a represents a molar ratio between 0.01 and 0.99;
R represents hydrogen or methyl;
R1 represents $C_1$-$C_8$ alkyl or $C_1$-$C_8$ alkyloxy;
w represents a number of repeating units between 10 and 50;
m represents a number of repeating units between 1 and 10;
Y represents linear or branched $C_2$-$C_4$ alkyl;
Q represents a spacer group;
NIR represents said chromophore;
L represents:

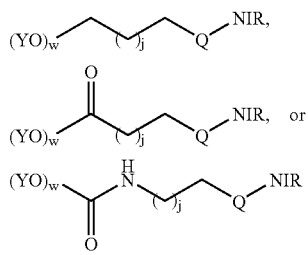

wherein the Q-NIR and (YO)$_w$ groups are indicated for clarity and j represents a number of repeating unit between 0 and 10.

6. The polymeric particle of claim 5 wherein said spacer group is:

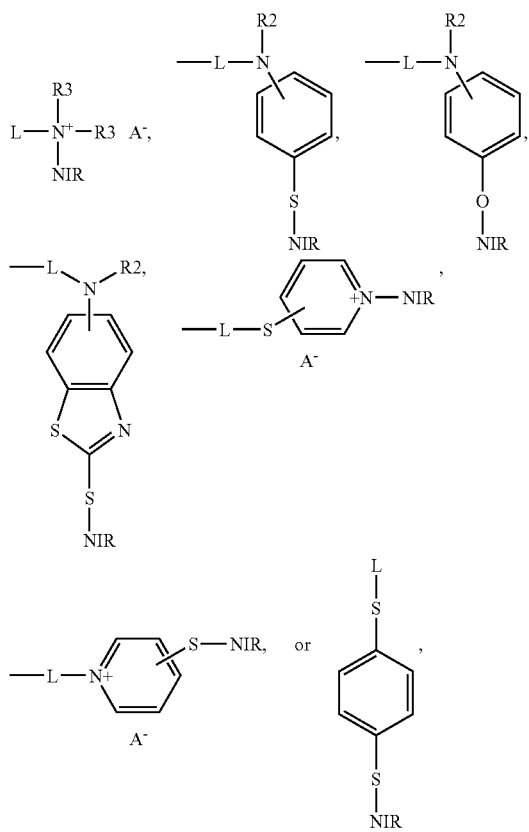

wherein the L and NIR groups are indicated for clarity; R2 represents $C_1$-$C_8$ alkyl or $C_1$-$C_8$ alkyloxy; R3 is the same as R2 or a phenyl ring substituted by H or R2; and A represents an anion.

7. The polymeric particle of claim 6 wherein said anion is bromide, chloride, iodide, tosylate, tetraphenylborate, alkyl triphenyl borate, tetrafluoro borate, or hexafluoroantimonate.

8. The polymeric particle of claim 1 wherein two polymer backbones are crosslinked via two absorbing segments and one chromophore.

9. The polymeric particle of claim 1 wherein said chromophore is:

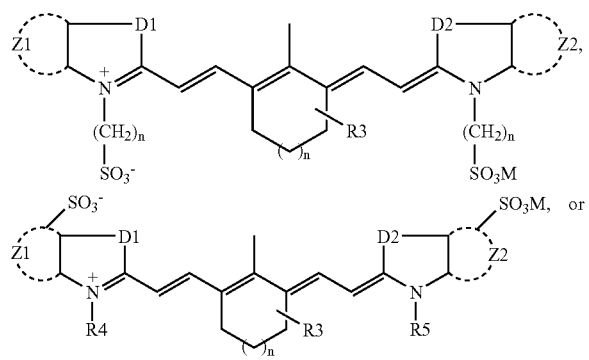

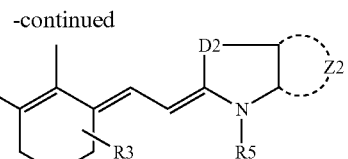

wherein:
D1 and D2 each independently represent —O—, —S—, —Se—, —OH=OH—, or —C(CH$_3$)$_2$;
Z1 and Z2 each independently represent one or more coalesced substituted or unsubstituted aromatic ring;
h represents an integer between 2 and 8;
n represents 0 or 1;
M represents hydrogen or a Na, K, or tetraalkylammonium salt cationic counter ion.
A1 represents a bromide, chloride, iodide, tosylate, triflate, trifluoromethane carbonate, dodecyl benzosylfonate, tetrafluoroborate, tetraphenylborate or triphenyl-n-butylborate anionic counter ion;
R3 represents hydrogen or alkyl; and
R4 and R5 each independently represent alkyl, aryl alkyl, hydroxy alkyl, amino alkyl, carboxy alkyl, sulfo alkyl, acetoxyl alkyl, polyether or a polymerizable substituent of formula:

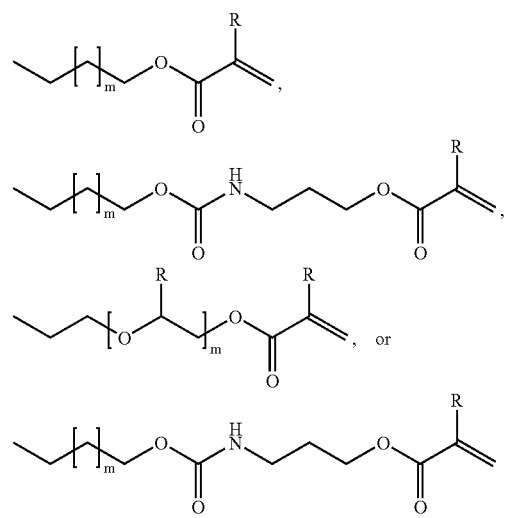

wherein m represents a number of repeating unit between 0 and 50; and R is hydrogen or methyl.

10. The polymeric particle of claim 1 wherein said transparent segment comprises styrene, substituted styrene, alpha-methylstyrene, 4-vinylphenol, 3-vinylbenzaldehyde, acrylate ester, methacrylate ester, acrylonitrile, acrylamide, methacrylamide, vinyl halide, vinyl ester, vinyl ether, 9-vinylcarbazole, or vinyl phosphoric acid transparent monomeric units.

11. The polymeric particle of claim 1 wherein said transparent segment comprises transparent monomeric units obtained by polymerizing polyether monomers of formula:

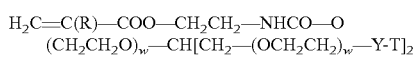

or mixtures thereof, wherein:
- R represents hydrogen or methyl;
- Y represents $C_2$-$C_4$ alkyl;
- w represents a number repeating unit between 5 and 50; and
- T represents a hydroxy, alkoxy, aryloxy, carboxylic acid, sulfonic acid, or phosphoric acid terminating group and their salts.

12. The polymeric particle claim 1 wherein said transparent segment comprises:
- poly(ethylene glycol) (meth)acrylate,
- poly(propylene glycol) (meth)acrylate,
- poly(ethylene glycol-block-propylene glycol) (meth)acrylate,
- poly(ethylene glycol-block-caprolactone) (meth)acrylate,
- poly(ethylene glycol) alkyl ether (meth)acrylate,
- poly(propylene glycol) alkyl ether (meth)acrylate,
- poly(ethylene glycol-block-propylene glycol) alkyl ether (meth)acrylate,
- poly(ethylene glycol-block-caprolactone) alkyl ether (meth)acrylate monomeric units or mixtures thereof.

13. The polymeric particle of claim 1 wherein said transparent segment comprises one or more transparent monomeric units obtained by polymerizing a monomer having two polymerizable functional groups, thereby crosslinking two polymer backbones via one transparent monomeric unit.

14. A coating composition comprising
- (a) the polymeric particles of claim 1; and
- (b) a reactive iodonium oligomer.

15. The coating composition of claim 14 comprising between about 10 and about 90% by solid weight of said polymeric particles.

16. The coating composition of claim 14 comprising between about 10 and about 90% by solid weight of said reactive iodonium oligomer.

17. The coating composition of claim 14 further comprising a polymer binder.

18. The coating composition of claim 17 where the coating composition comprises between about 2 and about 40% by solid weight of said polymer binder.

19. The coating composition of claim 17 further comprising a colorant, a stabilizer, a sensitizer or mixtures thereof.

20. The coating composition of claim 19 where the coating composition comprises between about 0.5 and about 10% by solid weight of said colorant, stabilizer, sensitizer or mixtures thereof.

21. A negative-working lithographic offset printing plate comprising:
- (a) a substrate;
- (b) a hydrophilic under layer; and
- (c) a laser imageable upper layer, wherein said laser imageable upper layer comprises the polymeric particle of claim 1.

22. A negative-working lithographic offset printing plate comprising:
- (a) a substrate;
- (b) a hydrophilic under layer; and
- (c) a laser imageable upper layer, wherein said laser imageable upper layer comprises the coating composition of claim 14.

* * * * *